United States Patent
Mondal et al.

(10) Patent No.: US 11,979,904 B2
(45) Date of Patent: May 7, 2024

(54) DETECTION OF LISTEN BEFORE TALK FAILURE DURING RADIO LINK MONITORING

(71) Applicant: Intel Corporation, Santa Clara, CA (US)

(72) Inventors: Bishwarup Mondal, San Ramon, CA (US); Prerana Rane, Santa Clara, CA (US); Yongjun Kwak, San Diego, CA (US); Rui Huang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/062,384

(22) Filed: Oct. 2, 2020

(65) Prior Publication Data

US 2021/0022182 A1    Jan. 21, 2021

Related U.S. Application Data

(60) Provisional application No. 62/911,032, filed on Oct. 4, 2019.

(51) Int. Cl.
| | | |
|---|---|---|
| H04W 74/08 | (2009.01) | |
| H04B 7/06 | (2006.01) | |
| H04L 1/20 | (2006.01) | |
| H04L 5/00 | (2006.01) | |
| H04W 24/08 | (2009.01) | |
| H04W 24/10 | (2009.01) | |
| H04W 56/00 | (2009.01) | |
| H04W 74/0808 | (2024.01) | |
| H04W 80/08 | (2009.01) | |
| H04W 88/06 | (2009.01) | |

(52) U.S. Cl.
CPC ...... *H04W 74/0808* (2013.01); *H04B 7/0626* (2013.01); *H04L 1/203* (2013.01); *H04L 5/0051* (2013.01); *H04W 24/08* (2013.01); *H04W 24/10* (2013.01); *H04W 56/001* (2013.01); *H04W 80/08* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2019/0089579 A1* | 3/2019 | Sang | H04W 36/00837 |
| 2020/0145091 A1* | 5/2020 | Luo | H04W 72/046 |
| 2021/0051499 A1* | 2/2021 | Chen | H04W 80/08 |
| 2021/0051720 A1* | 2/2021 | Thyagarajan | H04W 74/0816 |
| 2021/0136606 A1* | 5/2021 | Jia | H04W 74/0833 |
| 2021/0321277 A1* | 10/2021 | Murray | H04W 56/001 |
| 2022/0061116 A1* | 2/2022 | Lim | H04W 24/08 |
| 2022/0086784 A1* | 3/2022 | Kim | H04W 56/0035 |

* cited by examiner

*Primary Examiner* — Scott M Sciacca
(74) *Attorney, Agent, or Firm* — Schwabe, Williamson & Wyatt, P.C.

(57) ABSTRACT

Disclosed embodiments are related to distinguishing between listen-before talk (LBT) failure and LBT success, reducing the effect of invalid out-of-sync (OOS) indications and preventing false declaration of radio link failures (RLFs). Other embodiments may be described and/or claimed.

19 Claims, 10 Drawing Sheets

DETECTION OF LISTEN BEFORE TALK FAILURE DURING RADIO LINK MONITORING

CROSS REFERENCE TO RELATED APPLICATION

The present application claims priority to U.S. Provisional App. No. 62/911,032 filed Oct. 4, 2019, the contents of which is hereby incorporated by reference in its entirety.

FIELD

Embodiments relate generally to the technical field of wireless communications and communication networks, and in particular to Radio Link Monitoring (RLM).

BACKGROUND

In cellular communication systems, such as 3GPP Long Term Evolution (LTE) and/or Fifth Generation (5G)/New Radio (NR), user equipment (UE) monitors the quality of a downlink (DL) radio link to determine in-sync and out-of-sync (OOS) statuses. In NR unlicensed (NR-U), due to listen before talk (LBT) failure, it is difficult to distinguish between OOS indication arising from poor link quality vs OOS indication arising from LBT failure.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
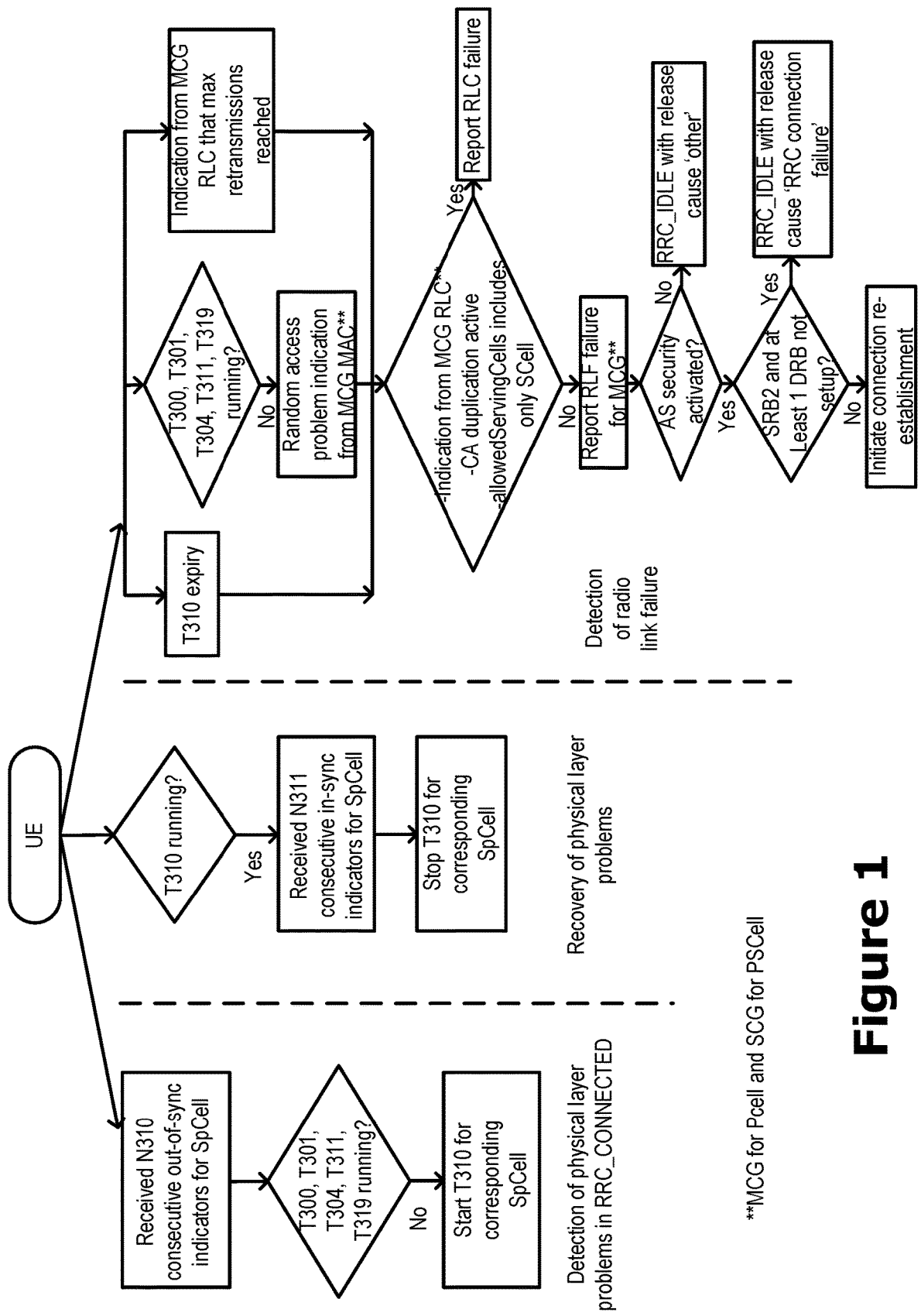
FIG. 1 illustrates an example radio link monitoring (RLM) process, according to various embodiments.

In cellular communication systems, such as 3GPP Long Term Evolution (LTE) and/or Fifth Generation (5G)/New Radio (NR), a user equipment (UE) (e.g., UE UE 402 of FIG. 4) monitors the quality of a downlink (DL) radio link to determine in-sync (IS)/out-of-sync (OOS) status. In NR unlicensed (NR-U), due to listen before talk (LBT) failure, it is difficult to distinguish between OOS indication arising from poor link quality vs OOS indication arising from LBT failure. Based on N310 consecutive OOS indications, radio link failure (RLF) is declared.

TABLE 1

Evaluation of link quality and LBT status to evaluate in-sync/OOS status

| Link Quality | LBT | Indicator | Comments |
| --- | --- | --- | --- |
| Poor | Failure | Out-of-sync | Valid OOS |
| Poor | Success | Out-of-sync | Valid OOS |
| Good | Failure | Out-of-sync | Invalid OOS. This proposal aims to identify and prevent this situation. |
| Good | Success | In-sync | No OOS |

The embodiments herein distinguish between LBT failure and LBT success, reducing the effect of invalid OOS indications and preventing false declaration of RLFs. According to various embodiments, a hypothetical Physical Downlink Control Channel (PDCCH) block error rate (BLER) is calculated to determine in-sync (IS)/out-of-sync (OOS) indication. If RLM-RS transmissions fail due to poor link quality, the or Signal-to-Interference plus Noise Ratio (SINR) for the link is expected to be very low, resulting in OOS indication. However if an expected instance of a periodically configured RLM-RS transmission fail due to LBT failure, the missed transmissions will result in the UE 402 indicating an out-of-sync status due to the absence of the desired RLM-RS.

In various embodiments, a UE 402 identifies reference signal (RS) samples, weights a measurement from the identified RS samples, and indicates an output to higher layers for the purposes of radio link monitoring. In some embodiments, the identification of the RS samples comprises of detection of one or more synchronization signal blocks (SSBs). In some embodiments, the weighting of the measurement comprises identifying or determining a weighting factor from a configuration, which may be obtained from a from a gNB 416.

1. Radio Link Monitoring Aspects

Radio Link Monitoring (RLM) refers to mechanisms used by a UE 402 for monitoring the DL radio link quality (RLQ) of a primary cell (PCell) for the purpose of indicating OOS or IS status to higher layers. The UE 402 is not required to monitor the downlink radio link quality in DL BWPs other than the active DL BWP, as described in Clause 12 of 3GPP TS 38.213 v15.7.0 (2019 Sep. 28) ("[TS38213]"), on the PCell. If the active DL BWP is the initial DL BWP and for SSB and CORESET multiplexing pattern 2 or 3, as described in Clause 13 of [TS38213], the UE 402 is expected to perform RLM using the associated SS/PBCH block when the associated SSB index is provided by RadioLinkMonitoringRS If the UE 402 is configured with a SCG, as described in 3GPP TS 38.331 v15.7.0 (2019 Sep. 27) ("[TS38331]"), and the parameter rlf-TimersAndConstants is provided by higher layers and is not set to release, the downlink radio link quality of the PSCell of the SCG is monitored by the UE 402 for the purpose of indicating out-of-sync/in-sync status to higher layers. The UE 402 is not required to monitor the downlink radio link quality in DL BWPs other than the active DL BWP on the PSCell.

A UE 402 can be configured for each DL BWP of a SpCell 3GPP TS 38.321 v15.7.0 (2019 Sep. 28) ("[TS38321]") with a set of resource indexes, through a corresponding set of RadioLinkMonitoringRS, for radio link monitoring by failureDetectionResources. The UE 402 is provided either a CSI-RS resource configuration index, by csi-RS-Index, or a SS/PBCH block index, by ssb-Index. The UE 402 can be configured with up to $N_{LR-RLM}$ RadioLinkMonitoringRS for link recovery procedures, as described in Clause 6 of [TS38213], and for radio link monitoring. From the $N_{LR-RLM}$ RadioLinkMonitoringRS, up to $N_{RLM}$ RadioLinkMonitoringRS can be used for radio link monitoring depending on as described in Table 5-1, wherein is as defined in Clause 4.1, and up to two RadioLinkMonitoringRS can be used for link recovery procedures.

For operation with shared spectrum channel access, when a UE 402 is provided a SS/PBCH block index by ssb-Index, the UE 402 is expected to perform radio link monitoring using SS/PBCH block(s) in the discovery burst transmission window as described in Clause 4.1, where the SS/PBCH block(s) have candidate SS/PBCH block index(es) corresponding to SS/PBCH block index provided by ssb-Index.

If the UE 402 is not provided RadioLinkMonitoringRS and the UE 402 is provided for PDCCH receptions TCI states that include one or more of a CSI-RS. The UE 402 uses for radio link monitoring the RS provided for the active TCI state for PDCCH reception if the active TCI state for PDCCH reception includes only one RS.

If the active TCI state for PDCCH reception includes two RS, the UE 402 expects that one RS has QCL-TypeD (see e.g., 3GPP TS 38.214 v15.7.0 (2019 Sep. 28) ("[TS38214]")) and the UE 402 uses the RS with QCL-TypeD for radio link monitoring; the UE 402 does not expect both RS to have QCL-TypeD.

The UE 402 is not required to use for radio link monitoring an aperiodic or semi-persistent RS.

For $L_{max}=4$, the UE 402 selects the $N_{RLM}$ RS provided for active TCI states for PDCCH receptions in CORESETs associated with the search space sets in an order from the shortest monitoring periodicity. If more than one CORESETs are associated with search space sets having same monitoring periodicity, the UE 402 determines the order of the CORESET from the highest CORESET index as described in Clause 10.1 of [TS38213].

A UE 402 does not expect to use more than $N_{RLM}$ RadioLinkMonitoringRS for radio link monitoring when the UE 402 is not provided RadioLinkMonitoringRS.

Values of $N_{LR-RLM}$ and $N_{RLM}$ for different values of $L_{max}$ are given in Table 2.

TABLE 2

$N_{LR-RLM}$ and $N_{RLM}$ as a function of maximum number $L_{max}$ of SSBs per half frame

| $L_{max}$ | $N_{LR-RLM}$ | $N_{RLM}$ |
|---|---|---|
| 4 | 2 | 2 |
| 8 | 6 | 4 |
| 64 | 8 | 8 |

For a CSI-RS resource configuration, powerControlOffsetSS is not applicable and a UE 402 expects to be provided only 'noCDM' from cdm-Type, only 'one' and 'three' from density, and only '1 port' from nrofPorts [TS38214].

If a UE 402 is configured with multiple DL BWPs for a serving cell, the UE 402 performs RLM using the RS(s) corresponding to resource indexes provided by RadioLinkMonitoringRS for the active DL BWP or, if RadioLinkMonitoringRS is not provided for the active DL BWP, using the RS(s) provided for the active TCI state for PDCCH receptions in CORESETs on the active DL BWP.

In non-DRX mode operation, the physical layer in the UE 402 assesses once per indication period the radio link quality, evaluated over the previous time period defined in [10, TS 38.133] against thresholds ($Q_{out}$ and $Q_{in}$) configured by rlmInSyncOutOfSyncThreshold. The UE 402 determines the indication period as the maximum between the shortest periodicity for radio link monitoring resources and 10 msec.

In DRX mode operation, the physical layer in the UE 402 assesses once per indication period the radio link quality, evaluated over the previous time period defined in 3GPP TS 38.133 v15.6.0 (2019 Jul. 4) ("[TS38133]"), against thresholds ($Q_{out}$ and $Q_{in}$) provided by rlmInSyncOutOfSyncThreshold. The UE 402 determines the indication period as the maximum between the shortest periodicity for radio link monitoring resources and the DRX period.

The physical layer in the UE 402 indicates, in frames where the radio link quality is assessed, out-of-sync to higher layers when the radio link quality is worse than the threshold $Q_{out}$ for all resources in the set of resources for radio link monitoring. When the radio link quality is better than the threshold $Q_{in}$ for any resource in the set of resources for radio link monitoring, the physical layer in the UE 402 indicates, in frames where the radio link quality is assessed, in-sync to higher layers.

The UE 402 detects the DL RLQ by monitoring one or more Reference Signals for RLM (RLM-RS). In NR, UE 402 can be configured with up to {2, 4 or 8} RLM-RS resources (depending on the carrier frequency range of spCell) to measure the radio link quality. The RLM-RS resources can be all SSBs, or all CSI-RSs, or a mix of SSBs and CSI-RSs.

For the L1 assessment (after which the UE 402 provides the In-sync (IS) or Out-of-sync (OOS) indication), hypothetical block error rate (BLER) is used to determine whether the UE 402 is in in-sync (IS) or in out-of-sync (OOS) condition. A UE 402 assumes to be in IS condition, if at least one out of the configured RLM-RS resources is estimated to have a hypothetical BLER below a configurable threshold. On the other hand, the UE 402 assumes to be in OOS condition, if only all configured RLM-RS resources are estimated to have hypothetical BLER above another configurable threshold. For non-DRX, the minimum requirement for such IS and OOS assessment is done every maximum of either 10 ms or shortest periodicity of RLM-RS resource configuration. 5G/NR DRX may be the same or similar as LTE DRX in terms of number of DRX cycles. RAN4 specification defines the evaluation period in which the UE 402 is able to evaluate the IS and OOS condition for the RLM-RS resource(s).

As shown by FIG. 1, the RLF related actions include the following: detection of physical layer problems based on N310 out-of-sync indicators; recovery of physical layer problems based on N311 in-sync indicators; and detection of RLF and connection re-establishment.

Timer T310 is started when the UE 402 detects physical layer problems, when it receives N310 consecutive OOS indicators and is stopped when it receives N311 IS indicators. The constant N310 is the maximum number of consecutive "out-of-sync" indications for the SpCell received from lower layers, and the constant N311 is the maximum number of consecutive "in-sync" indications for the SpCell received from lower layers. If the T310 timer expires, it leads to a RLF. Timer T311 is started when connection reestablishment procedures are started. A summary of the timers is shown by Table 3.

TABLE 3

Timers

| Timer | Start | Stop | At expiry |
|---|---|---|---|
| T300 | Upon transmission of RRCSetupRequest. | Upon reception of RRCSetup or RRCReject message, cell re-selection and upon abortion of connection establishment by upper layers. | Perform the actions as specified in 5.3.37 of [TS38331]. |
| T301 | Upon transmission of RRCReestabilshmentRequest | Upon reception of RRCReestablishment or RRCSetup message as well as when the selected cell becomes unsuitable | Go to RRC_IDLE |
| T304 | Upon reception of RRCReconfiguration message including reconfigurationWithSync or upon conditional reconfiguration execution i.e. when applying a stored RRCReconfiguration message including reconfigurationWithSync. | Upon successful completion of random access on the corresponding SpCell For T304 of SCG, upon SCG release | For T304 of MCG, in case of the handover from NR or intra-NR handover, initiate the RRC re-establishment procedure; in case of handover to NR, perform the actions defined in the specifications applicable for the source RAT. If any DAPS bearer is configured and if there is no RLF in source PCell, initiate the failure information procedure. For T304 of SCG, inform network about the reconfiguration with sync failure by initiating the SCG failure information procedure as specified in 5.7.3 of [TS38331]. |
| T310 | Upon detecting physical layer problems for the SpCell i.e. upon receiving N310 consecutive out-of-sync indications from lower layers. | Upon receiving N311 consecutive in-sync indications from lower layers for the SpCell, upon receiving RRCReconfiguration with reconfigurationWithSync for that cell group, upon reception of MobilityFromNRCommand, upon the reconfiguration of rlf-TimersAndConstant, upon initiating the connection re-establishment procedure, and upon initiating the MCG failure information procedure. Upon SCG release, if the T310 is kept in SCG. | If the T310 is kept in MCG: If AS security is not activated: go to RRC_IDLE else: initiate the MCG failure information procedure as specified in 5.7.3b or the connection re-establishment procedure as specified in 5.3.7 of [TS38331] or the procedure as specified in 5.3.10.3 of [TS38331] if any DAPS bearer is configured. If the T310 is kept in SCG, Inform E-UTRAN/NR about the SCG RLF by initiating the SCG failure information procedure as specified in 5.7.3 of [TS38331]. |
| T311 | Upon initiating the RRC connection re-establishment procedure | Upon selection of a suitable NR cell or a cell using another RAT. | Enter RRC_IDLE |
| T319 | Upon transmission of RRCResumeRequest or RRCResumeRequest1. | Upon reception of RRCResume, RRCSetup, RRCRelease, RRCRelease with suspendConfig or RRCReject message, cell re-selection and upon abortion of connection establishment by upper layers. | Perform the actions as specified in 5.3.13.5 of [TS38331]. |

The values for timers T301, T310 and T311 and constants N310, N311 are obtained from the UE-TimersAndConstants information element (IE) in system information block type 1 (SIB1) if the received rlf-TimersAndConstants is set to release, else the values are configured based on the received rlf-TimersAndConstants. The IE UE-TimersAndConstants contains timers and constants used by the UE 402 in RRC_CONNECTED, RRC_INACTIVE and RRC_IDLE. An example of the UE-TimersAndConstants IE is shown by Table 4. The IE RLF-TimersAndConstants is used to configure UE specific timers and constants for detecting and triggering cell-level RLF. For the SCG, rlf-TimersAndConstants can only be set to setup and is always included at SCG addition. An example of the rlf-TimersAndConstants IE is shown by Table 5.

TABLE 4

UE-TimersAndConstants information element

```
-- ASN1START
-- TAG-UE-TIMERSANDCONSTANTS-START
UE-TimersAndConstants ::=   SEQUENCE {
    t300    ENUMERATED {ms100, ms200, ms300,
            ms400, ms600, ms1000, ms1500, ms2000},
    t301    ENUMERATED {ms100, ms200, ms300,
            ms400, ms600, ms1000, ms1500, ms2000},
    t310    ENUMERATED {ms0, ms50, ms100, ms200,
            ms500, ms1000, ms2000},
    n310    ENUMERATED {n1, n2, n3, n4, n6, n8,
            n10, n20},
    t311    ENUMERATED {ms1000, ms3000, ms5000,
            ms10000, ms15000, ms20000, ms30000},
    n311    ENUMERATED {n1, n2, n3, n4, n5, n6,
            n8, n10},
```

TABLE 4-continued

UE-TimersAndConstants information element t319    ENUMERATED {ms100, ms200, ms300, ms400,
        ms600, ms1000, ms1500, ms2000},
    ...
}
-- TAG-UE-TIMERSANDCONSTANTS-STOP
-- ASN1STOP

TABLE 5

RLF-TimersAndConstants information element

-- ASN1START
-- TAG-RLF-TIMERSANDCONSTANTS-START
RLF-TimersAndConstants ::=    SEQUENCE {
    t310 ENUMERATED {ms0, ms50, ms100, ms200, ms500,
        ms1000, ms2000, ms4000, ms6000},
    n310 ENUMERATED {n1, n2, n3, n4, n6, n8, n10, n20}, TABLE 5-continued RLF-TimersAndConstants information element n311 ENUMERATED {n1, n2, n3, n4, n5, n6, n8, n10},
    ...,
    [[
    t311 ENUMERATED {ms1000, ms3000, ms5000, ms10000,
        ms15000, ms20000, ms30000}
    ]]
}
-- TAG-RLF-TIMERSANDCONSTANTS-STOP
-- ASN1STOP During LBT failure, consecutive N310 OOS indicators even though the link quality is good will result in incorrect RLF. As an example, assume that for a particular UE 402, the probability that link quality is poor is 20%. Then, the probability of detecting various OOS indicators and IS indicators for three different medium congestion scenarios with LBT failure probability of 0%, 20%, and 80% is shown by Table 6.

TABLE 6

Example of probability of detection for various OOS indicators and IS indicator

| Case | L1 to higher layer indicator | LBT failure = 0% | LBT failure = 20% | LBT failure = 80% |
|---|---|---|---|---|
| 1 | IS (link good and LBT success) | 80% | 64% | 16% |
| 2 | OOS (link poor & LBT success) | 20% | 16% | 4% |
| 3 | OOS (link good & LBT failure) | 0% | 16% | 64% |
| 4 | OOS (link poor & LBT failure) | 0% | 4% | 16% |
|   | Total OOS % | 20% | 36% | 84% |

Figure 2:
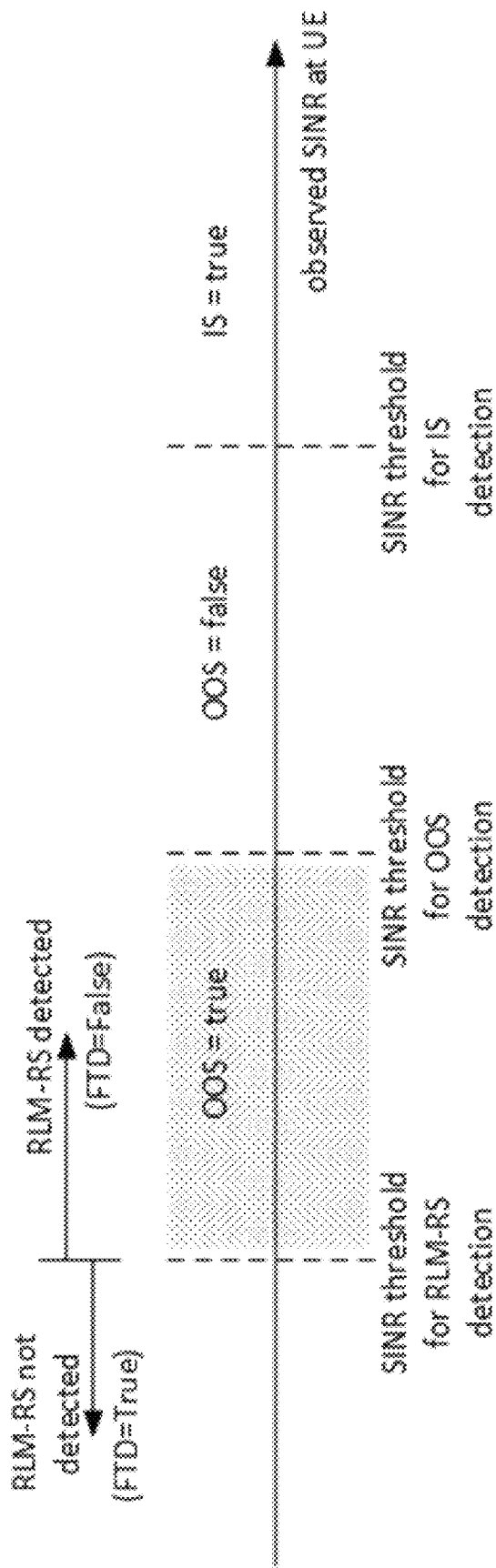
FIG. 2 illustrates an example where RLM-reference signal (RS) is successfully detected and or Signal-to-Interference plus Noise Ratio (SINR) is below an SINR threshold for out-of-sync (OOS) status detection, according to various embodiments.

From the example of Table 6, it can be observed that ideally, for example, in licensed band, OOS probability=20%. Depending on the medium congestion, this OOS probability goes up to 36% (when LBT failure is 20%) and up to 84% (when LBT failure is 80%). FIG. 2 shows an example of Case 2 in Table 6, wherein the RLM-RS is successfully detected and SINR is below the SINR threshold for OOS detection as shown in the shaded region of FIG. 2.

1.1. OOS Suppression Based on Detection of LBT Status

In various embodiments, LBT success may be detected at the UE 402 based on SSB detection or other side information (e.g., remaining Channel Occupancy Time (COT) time) at the same time OOS indication is true (Case 2 in Table 6). A third indicator type (e.g., failed to detect—FTD indication) should be sent to higher layers in addition to IS and OOS indications. Based on such information, Case 2 OOS indications could be weighted with respect to Case 3/Case 4 (e.g., in Table 6) OOS indications in 80:20 ratio as shown by Table 7. The weights could be indicated by the gNB 416 to the UE 402 in a suitable configuration. Application of such weighting for different OOS indicators results in the probabilities shown by Table 7.

TABLE 7

Modified probability of detection of OOS after weighting

| Case | L1 to higher layer indicator | LBT failure = 0% | LBT failure = 20% | LBT failure = 80% |
|---|---|---|---|---|
| 1 | IS & FTD = False (link good and LBT success) | 80% | 64% | 16% |
| 2 | OOS & FTD = False (link poor & LBT success) | 20% × 0.8 = 16% | 16% × 0.8 = 12.8% | 4% × 0.8 = 3.2% |
| 3 | OOS & FTD = True (link good & LBT failure) | 0% | 16% × 0.2 = 3.2% | 64% × 0.2 = 12.8% |

TABLE 7-continued

Modified probability of detection of OOS after weighting

| Case | L1 to higher layer indicator | LBT failure = 0% | LBT failure = 20% | LBT failure = 80% |
|------|------------------------------|------------------|-------------------|-------------------|
| 4 | OOS & FTD = True (link poor & LBT failure) | 0% | 4% × 0.2 = 0.8% | 16% × 0.2 = 3.2% |
| | Total OOS % | 16% | 16.8% | 19.2% |

From Table 7, it can be observed that suppression or weighting of some OOS indicators can help to reduce the false OOS indicators due to LBT failure (to a certain extent) although such mechanism is non-trivial and may need to adjust to different congestion levels. Accordingly, the following observations can be made:

OOS probability depends heavily on the medium congestion and may not reflect true link quality due to congestion.

In order to reduce false RLF a mechanism is needed to suppress some OOS indications. If it is left to UE 402 implementation then there will be no such requirement (from RAN4 perspective) and the NW will have no control over the responsiveness of the RLM procedure because the UE 402 autonomously will suppress certain OOS indicators.

If the weights are very much skewed for example 95:5 or 100:0 (e.g., Case 2: Case3/4) a UE 402 may actually lose the link synchronization if the medium is heavily congested. In order to take care of such scenario, additional timers can be used to allow triggering RLF based on N successive FTD=True indications.

1.2. OOS SUPPRESSION BASED ON BLER CALCULATION

If an indicator for LBT status is not available to higher layers, the BLER calculation can still be used to determine if link is good or poor quality. Based on such information, the OOS indicators in Cases 2, 3 and 4 can be weighted in 80:20 ratio as shown by Table 8.

TABLE 8

Modified probability of detection of OOS after weighting

| Case | L1 to higher layer indicator | LBT failure = 0% | LBT failure = 20% | LBT failure = 80% |
|------|------------------------------|------------------|-------------------|-------------------|
| 1 | IS (link good and LBT success) | 80% | 64% | 16% |
| 2 | OOS (link poor & LBT success) | 20% × 0.8 = 16% | 16% × 0.8 = 12.8% | 4% × 0.8 = 3.2% |
| 3 | OOS (link good & LBT failure) | 0% | 16% × 0.2 = 3.2% | 64% × 0.2 = 12.8% |
| 4 | OOS (link poor & LBT failure) | 0% | 4% × 0.8 = 3.2% | 16% × 0.8 = 12.8% |
| | Total OOS % | 16% | 19.2% | 28.8% |

1.3. UE Implementation Based Approach

Figure 3:
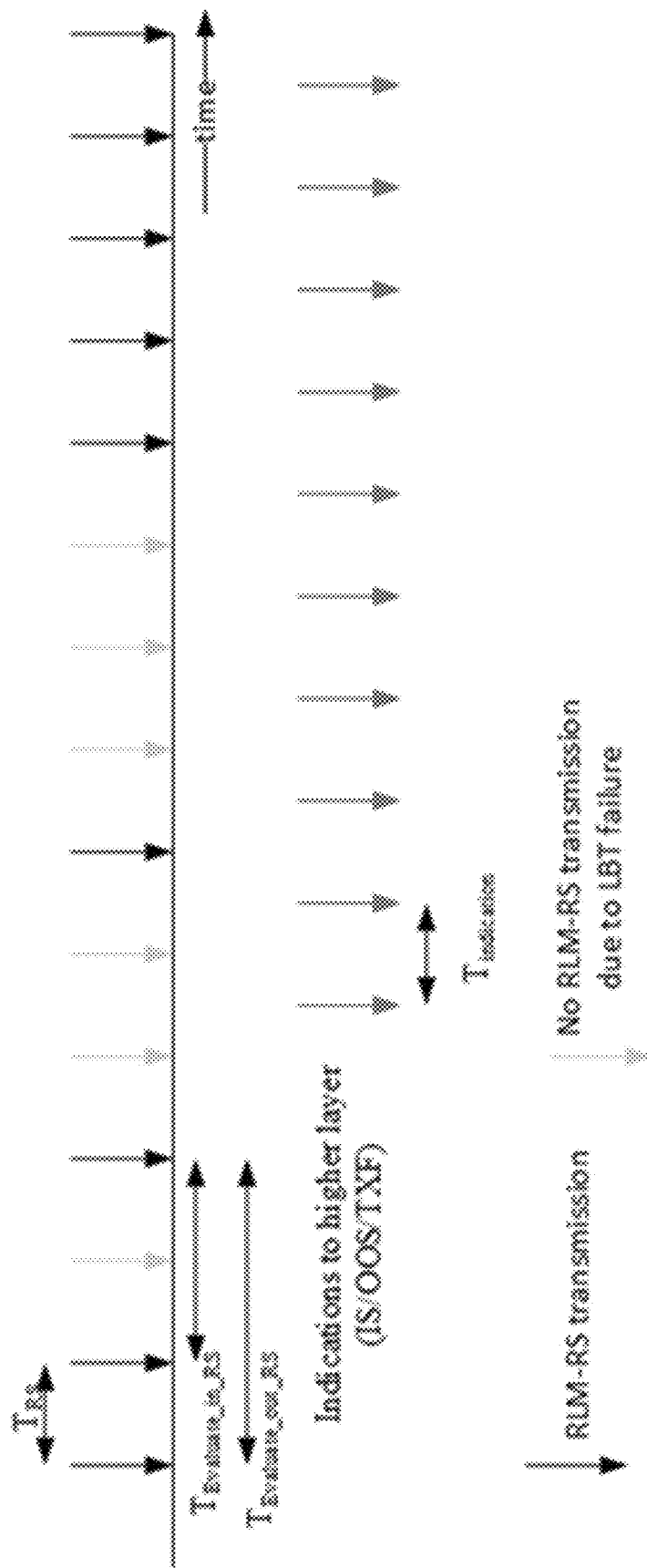
FIG. 3 illustrates an example RLM-RS transmission window, according to various embodiments.

FIG. 3 shows an example RLM-RS transmission window according to various embodiments. Within an OOS evaluation window, assume that the UE 402 identifies missing RLM-RS transmissions (e.g., due to LBT failure) using some detection mechanism (e.g., SSB detection) as described previously. If the UE 402 disregards the missed samples in the BLER calculation, the signal-to-noise ratio (SNR) derived from other samples in the evaluation window will mostly reflect the true link condition for OOS determination. In general, instead of disregarding the missing RLM-RS samples, the UE 402 may weigh the output from such calculation as shown in Table 8.

2. Example Systems and Device Configurations and Arrangements

Figure 4:
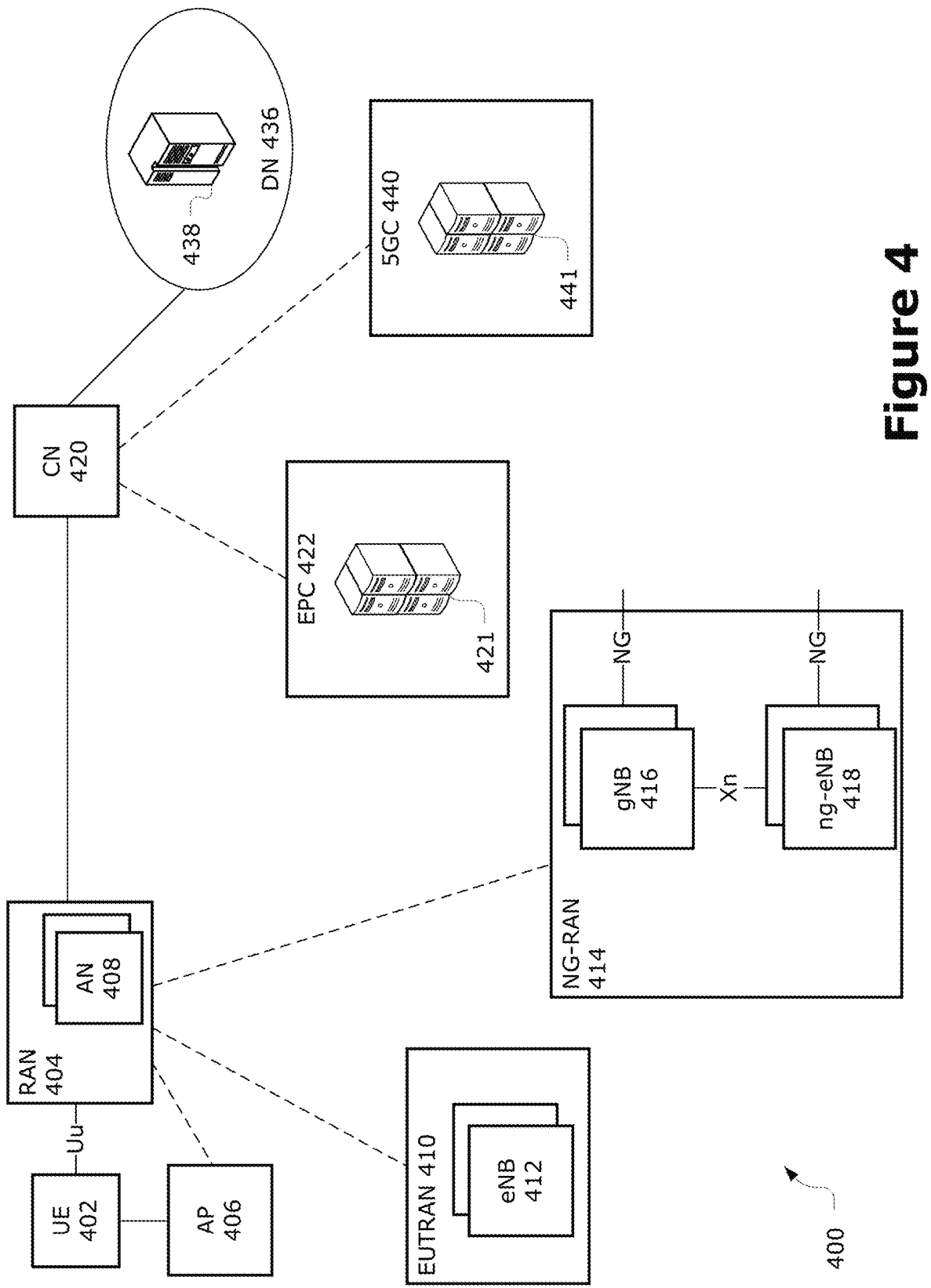
FIG. 4 illustrates an example network architecture according to various embodiments.

Referring now to FIG. 4, which illustrates a network 400 in accordance with various embodiments. The network 400 may operate in a manner consistent with 3GPP technical specifications for Long Term Evolution (LTE) or 5G/NR systems. However, the example embodiments are not limited in this regard and the described embodiments may apply to other networks that benefit from the principles described herein, such as future 3GPP systems, or the like.

The network 400 includes a UE 402, which is any mobile or non-mobile computing device designed to communicate with a RAN 404 via an over-the-air connection. The UE 402 is communicatively coupled with the RAN 404 by a Uu interface, which may be applicable to both LTE and NR systems. Examples of the UE 402 include, but are not limited to, a smartphone, tablet computer, wearable computer, desktop computer, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, machine-to-machine (M2M), device-to-device (D2D), machine-type communication (MTC) device, Internet of Things (IoT) device, and/or the like. The network 400 may include a plurality of UEs 402 coupled directly with one another via a D2D, ProSe, PC5, and/or sidelink (SL) interface. These UEs 402 may be M2M/D2D/MTC/IoT devices and/or vehicular systems that communicate using physical SL channels such as, but not limited to, Physical Sidelink Broadcast Channel (PSBCH), Physical Sidelink Discovery Channel (PSDCH), Physical Sidelink Shared Channel (PSSCH), Physical Sidelink Control Channel (PSCCH), Physical Sidelink Feedback Channel (PSFCH), etc.

In some embodiments, the UE 402 may additionally communicate with an AP 406 via an over-the-air (OTA)

connection. The AP 406 manages a WLAN connection, which may serve to offload some/all network traffic from the RAN 404. The connection between the UE 402 and the AP 406 may be consistent with any IEEE 802.11 protocol. Additionally, the UE 402, RAN 404, and AP 406 may utilize cellular-WLAN aggregation/integration (e.g., LWA/LWIP). Cellular-WLAN aggregation may involve the UE 402 being configured by the RAN 404 to utilize both cellular radio resources and WLAN resources.

The UE 402 may be configured to perform signal and/or cell measurements based on a configuration obtain from the network (e.g., RAN 404). The UE 402 derives cell measurement results by measuring one or multiple beams per cell as configured by the network. For all cell measurement results, the UE 402 applies layer 3 (L3) filtering before using the measured results for evaluation of reporting criteria and measurement reporting. For cell measurements, the network can configure Reference Signal Received Power (RSRP), Reference Signal Received Quality (RSRQ), and/or Signal-to-Interference plus Noise Ratio (SINR) as a trigger quantity. Reporting quantities can be the same as the trigger quantity or combinations of quantities (e.g., RSRP and RSRQ; RSRP and SINR; RSRQ and SINR; RSRP, RSRQ and SINR). In other embodiments, other measurements and/or combinations of measurements may be used as a trigger quantity such as those discussed in 3GPP TS 36.214 v15.3.0 (2018 Sep. 27) (hereinafter "[TS36214]"), 3GPP TS 38.215 v15.5.0 (2019 Jun. 24) (hereinafter "[TS38215]"), Institute of Electrical and Electronics Engineers (IEEE) Standards Association, "IEEE Computer Society: "Part 11: Wireless LAN Medium Access Control (MAC) and Physical Layer (PHY) Specifications", IEEE Std 802.11™-2012 (2012) (hereinafter "[IEEE80211]"), and/or the like.

The RAN 404 includes one or more access network nodes (ANs) 408. The ANs 408 terminate air-interface(s) for the UE 402 by providing access stratum protocols including Radio Resource Control (RRC), Packet Data Convergence Protocol (PDCP), Radio Link Control (RLC), Medium Access Control (MAC), and physical (PHY/L1) layer protocols. In this manner, the AN 408 enables data/voice connectivity between CN 420 and the UE 402.

The ANs 408 may be a macrocell base station or a low power base station for providing femtocells, picocells or other like cells having smaller coverage areas, smaller user capacity, or higher bandwidth compared to macrocells; or some combination thereof. In these implementations, an AN 408 be referred to as a BS, gNB, RAN node, eNB, ng-eNB, NodeB, RSU, TRxP, etc.

One example implementation is a "CU/DU split" architecture where the ANs 408 are embodied as a gNB-Central Unit (CU) that is communicatively coupled with one or more gNB-Distributed Units (DUs), where each DU may be communicatively coupled with one or more Radio Units (RUs) (also referred to as RRHs, RRUs, or the like) (see e.g., 3GPP TS 38.401 v15.7.0 (2020 Jan. 9)). In some implementations, the one or more RUs may be individual RSUs. In some implementations, the CU/DU split may include an ng-eNB-CU and one or more ng-eNB-DUs instead of, or in addition to, the gNB-CU and gNB-DUs, respectively. The ANs 408 employed as the CU may be implemented in a discrete device or as one or more software entities running on server computers as part of, for example, a virtual network including a virtual Base Band Unit (BBU) or BBU pool, cloud RAN (CRAN), Radio Equipment Controller (REC), Radio Cloud Center (RCC), centralized RAN (C-RAN), virtualized RAN (vRAN), and/or the like (although these terms may refer to different implementation concepts). Any other type of architectures, arrangements, and/or configurations can be used.

The UE 402 can be configured to communicate using Orthogonal Frequency Division Multiplexing (OFDM) communication signals with each other or with the AN 408 over a multicarrier communication channel in accordance with various communication techniques, such as, but not limited to, an OFDMA communication technique (e.g., for downlink (DL) communications) or a Single Carrier Frequency Division Multiple Access (SC-FDMA) communication technique (e.g., for uplink (UL) and ProSe/SL communications), although the scope of the embodiments is not limited in this respect. The OFDM signals can comprise a plurality of orthogonal subcarriers.

DL and UL transmissions may be organized into frames with 10 ms durations, where each frame includes ten 1 ms subframes, and each subframe includes an integer number of slots. Time-frequency radio resource grids may be used to indicate physical resources in the DL or UL in corresponding slots. Each column and each row of the DL resource grid corresponds to one OFDM symbol and one OFDM subcarrier, respectively, and each column and each row of the UL resource grid corresponds to one SC-FDMA symbol and one SC-FDMA subcarrier, respectively. There is one resource grid for a given antenna port p, subcarrier spacing (SCS) configuration $\mu$, and transmission direction (DL or UL). The frequency location of a subcarrier refers to the center frequency of that subcarrier. Each element in the resource grid for antenna port p and SCS configuration $\mu$ is called a resource element (RE) and is uniquely identified by $(k,l)_{p,\mu}$ where k is the index in the frequency domain (e.g., k is a subcarrier index relative to a reference or reference point) and l refers to the symbol position in the time domain relative to some reference point (e.g., l is an OFDM symbol index relative to a reference or reference point). RE $(k,l)_{p,\mu}$ corresponds to a physical resource and the complex value $a_{k,l}^{(p,\mu)}$. In other words, $a_{k,l}^{(p,\mu)}$ is the value of RE (k, l) for antenna port p and SCS configuration $\mu$.

An antenna port is defined such that the channel over which a symbol on the antenna port is conveyed can be inferred from the channel over which another symbol on the same antenna port is conveyed. Two antenna ports are said to be quasi co-located (QCLed) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and/or spatial Rx parameters.

A collection of REs make up a resource block (RB), which is usually defined as $N_{sc}^{RB}=12$ consecutive subcarriers in the frequency domain. Physical RBs (PRBs) blocks for subcarrier configuration are defined within a bandwidth part (BWP) and numbered from 0 to $N_{BWP,i}^{size,\mu}-1$ where i is the number of the BWP. Virtual RBs (VRBs) are defined within a BWP and numbered from 0 to $N_{BWP,i}^{size}-1$ where i is the number of the BWP.

A BWP is a subset of contiguous common RBs for a given numerology $\mu_i$ in BWP i on a given carrier. The UE 402 can be configured with up to four BWPs in the DL with a single DL BWP being active at a given time. The UE 402 is not expected to receive PDSCH, PDCCH, or CSI-RS (except for RRM) outside an active BWP. The UE 402 can be configured with up to four BWPs in the UL with a single UL BWP being active at a given time. The UE 402 does not transmit PUSCH or PUCCH outside an active BWP. For an active cell, the UE 402 does not transmit SRS outside an active BWP.

Common RBs are numbered from 0 and upwards in the frequency domain for SCS configuration μ. The center of subcarrier 0 of common RB 0 for SCS configuration μ coincides with 'point A'. The relation between the common RB number $n_{CRB}^{\mu}$ in the frequency domain and resource elements (k, l) for SCS configuration μ is given by $$n_{CRB}^{\mu} = \left\lfloor \frac{k}{N_{sc}^{RB}} \right\rfloor,$$

where k is defined relative to point A such that k=0 corresponds to the subcarrier centered around point A.

Point A serves as a common reference point for RB grids and is obtained from the parameters offsetToPointA PCell DL and absoluteFrequencyPointA for all other cases. The parameter offsetToPointA represents the frequency offset between point A and the lowest subcarrier of the lowest RB, which has the SCS provided by the higher-layer parameter subCarrierSpacingCommon and overlaps with the SS/PBCH block used by the UE 402 for initial cell selection, expressed in units of RBs assuming 15 kHz SCS for FR1 and 60 kHz SCS for FR2. The parameter absoluteFrequencyPointA for all other cases where absoluteFrequencyPointA represents the frequency-location of point A expressed as in Absolute Radio-Frequency Channel Number (ARFCN).

There are several different physical channels and physical signals that are conveyed using RBs, PRBs, and/or individual REs. A physical channel corresponds to a set of REs carrying information originating from higher layers. Physical channels include physical UL channels (e.g., physical UL shared channel (PUSCH), physical UL control channel (PUCCH), physical random access channel (PRACH), etc.) and physical DL channels (e.g., physical DL shared channel (PDSCH), physical DL control channel (PDCCH), physical broadcast channel (PBCH), etc.). A physical signal is used by the physical layer (PHY) but does not carry information originating from higher layers. Physical signals include physical UL signals (e.g., Demodulation Reference Signal (DMRS or DM-RS), Phase-Tracking Reference Signal (PTRS), Sounding Reference Signal (SRS), etc.) and physical DL signals (e.g., DMRS, PTRS, Channel State Information Reference Signal (CSI-RS), Primary Synchronization Signal (PSS), Secondary Synchronization Signal (SSS), etc.).

The PDSCH carries user data and higher-layer signaling to the UEs 402, and the PDCCH carries DL resource assignment information for receiving the PDSCH. Each UE 402 monitors a set of PDCCH candidates on one or more activated serving cells as configured by higher layer signaling for control information (e.g., Downlink Control Information (DCI)), where monitoring implies attempting to decode a set of PDCCH candidates according one or more monitored DCI formats (e.g., DCI formats 0 through 6-2 as discussed in section 5.3.3 of 3GPP TS 38.212 v15.7.0 (2019 Sep. 28) ("[TS38212]"), DCI formats 0_0 through 2_3 as discussed in section 7.3 of [TS38212], or the like). The DCI includes, inter alia, DL assignments and/or UL scheduling grants including, for example, modulation and coding format, resource allocation, and HARQ information, among other information/commands. Each UE 402 monitors (or attempts to decode) respective sets of PDCCH candidates in one or more configured monitoring occasions according to UE or cell-specific search spaces (for LTE/4G), or monitors (or attempts to decode) respective sets of PDCCH candidates in one or more configured monitoring occasions in one or more configured Control Resource Sets (CORESETs) according to corresponding search space configurations (for NR/5G). A CORESET includes a set of PRBs with a time duration of 1 to 3 OFDM symbols. The REGs and control channel elements (CCEs) are defined within a CORESET with each CCE including a set of REGs. Interleaved and non-interleaved CCE-to-REG mapping are supported in a CORESET. Each REG carrying PDCCH carries its own DMRS. The ControlResourceSet information element (IE) in an RRC configuration message is used to configure a time/frequency CORESET in which to search for DCI (see e.g., [TS38213]).

PDSCH transmissions are scheduled by DCI format 1_0 and DCI format 1_1. DCI format 1_0 is used for the scheduling of PDSCH in one DL cell and DCI format 1_1 is used for the scheduling of PDSCH in one cell. DCI format 1_0 includes, inter alia, a frequency domain resource assignment, a time domain resource assignment, and other fields/elements as discussed in [TS38212]. DCI format 1_1 includes, inter alia, a bandwidth part indicator, a frequency domain resource assignment, a time domain resource assignment, antenna port(s) where the number of CDM groups without data of values 1, 2, and 3 refers to CDM groups {0}, {0,1}, and {0, 1,2} respectively and the antenna ports {$p_0, \ldots p_{v-1}$} are determined according to the ordering of DMRS port(s) given by Tables 7.3.1.2.2-1/2/3/4 of [TS38212], and other fields/elements as discussed in [TS38212].

The UE 402 can be configured with a list of up to M TCI-State configurations within the higher layer parameter PDSCH-Config to decode the PDSCH according to a detected PDCCH with DCI intended for the UE 402 and the given serving cell, where M depends on the UE capability maxNumberConfiguredTCIstatesPerCC. The PDSCH-Config information element (IE) is used to configure UE-specific PDSCH parameters including the tci-StatesToAddModList parameter, which includes a list of Transmission Configuration Indicator (TCI) states indicating a transmission configuration. Each TCI-State IE contains a tci-StateId used to identify a corresponding TCI-State configuration and parameters for configuring a QCL relationship between one or two DL reference signals and the DM-RS ports of the PDSCH, the DM-RS port of PDCCH, or the CSI-RS port(s) of a CSI-RS resource. The QCL relationship is configured by the higher layer parameter qcl-Type1 for the first DL RS, and qcl-Type2 for the second DL reference signal (RS), if configured. For the case of two DL RSs, the QCL types are not be the same, regardless of whether the references are to the same DL RS or different DL RSs. In addition to the qcl-Type1 and qcl-Type2 parameters, the TCI-State IE also contains a QCL Info IE, which includes a bwp-Id parameter indicating the DL BWP which the RS is located in, a referenceSignal parameter indicating an RS with which QCL information is provided as specified in subclause 5.1.5 of [TS38214], a cell parameter indicating the UE's 402 serving cell in which the referenceSignal is configured or the serving cell in which the TCI-State is configured if the referenceSignal field is absent, and a qcl-Type indicating the QCL type (enumerated with typeA, typeB, typeC, or typeD as discussed infra).

The QCL types corresponding to each DL RS are given by the higher layer parameter qcl-Type in QCL-Info and may take one of the following values: 'QCL-TypeA' for QCL with respect to (w.r.t.) Doppler shift, Doppler spread, average delay, delay spread, 'QCL-TypeB' w.r.t. Doppler shift, Doppler spread, 'QCL-TypeC' w.r.t. Doppler shift, average delay, and 'QCL-TypeD' w.r.t. Spatial Rx parameter. If the TCI-State is configured with a reference to an RS with 'QCL-TypeD' association, that RS may be an SSB located in the same or different CC/DL BWP or a CSI-RS resource configured as periodic located in the same or different CC/DL BWP.

The UE receives an activation command (e.g., a MAC CE), as described infra and as described in subclause 6.1.3.14 of [TS38321], used to map up to 8 TCI states to the codepoints of the DCI field 'Transmission Configuration Indication'. If no RSs are provided for BFD, the UE 402 performs beam monitoring based on the activated TCI-State for PDCCH as described in clause 6 of [TS38213].

The radio interface between the UEs 402 and the RAN 408 is governed by the Radio Resource Control (RRC) protocol. RRC provides functions including, inter alia, RRC connection control, measurement configuration and reporting, among others. RRC connection control includes, inter alia, paging procedures, radio configuration control, and RRC connection establishment, modification, suspension, resumption, and release. During RRC connection establishment, the network (NW) may configure the UE 402 to perform measurement reporting or other like functions. RRC includes various UE 402 operating states including RRC_CONNECTED, RRC_INACTIVE, and RRC_IDLE. The UE 402 is in RRC_IDLE when no RRC connection is established, and the UE 402 is in RRC_CONNECTED and RRC_INACTIVE when a connection is established. The UE 402 in RRC_CONNECTED transfers unicast data; monitors control channels associated with the shared data channel to determine if data is scheduled for the UE 402; provides channel quality and feedback information; performs neighbor cell measurements and measurement reporting; and acquires system information (SI).

The RRC connection control functions include, inter alia, radio link failure (RLF) functions, link recovery functions, beam failure detection (BFD) functions, and beam failure recovery (BFR) functions. RLM refers to mechanisms used by the UE 402 for monitoring the DL radio link quality (RLQ) of a primary cell (PCell) for the purpose of indicating out-of-sync/in-sync status to higher layers. The term "a "Primary Cell" or "PCell" refers to a master cell group (MCG) cell, operating on a primary frequency, in which the UE 402 either performs an initial connection establishment procedure or initiates a connection re-establishment procedure. The UE 402 is not required to monitor the DL RLQ in DL BWPs other than the active DL BWP on the PCell. If the active DL BWP is the initial DL BWP and for SSBs and CORESET multiplexing pattern 2 or 3, the UE 402 is expected to perform RLM using the associated SSB when the associated SSB index is provided by the parameter/IE RadioLinkMonitoringRS. The term "SSB" refers to both a synchronization signal block and a synchronization signal (SS)/PBCH block.

In RRC_CONNECTED, the UE 402 performs RLM in the active BWP based on reference signals (e.g., SSB, CSI-RS, etc.) and signal quality thresholds configured by the NW. SSB-based RLM is based on the SSB associated to the initial DL BWP and can only be configured for the initial DL BWP and for DL BWPs containing the SSB associated to the initial DL BWP. For other DL BWPs, RLM is performed based on CSI-RS. The UE 402 declares an RLF when one of the following criteria are met: expiration of a timer started after indication of radio problems from the physical layer (if radio problems are recovered before the timer is expired, the UE stops the timer); a random access (RA) procedure failure is detected; and/or upon detection of a RLC failure. After an RLF is declared, the UE 402 stays in RRC_CONNECTED; selects a suitable cell and initiates the RRC connection re-establishment procedure; and/or enters RRC_IDLE if a suitable cell was not found within a certain time after RLF was declared.

For detection of physical layer problems in RRC_CONNECTED, the UE 402 starts the timer T310 for a corresponding special cell (SpCell) upon receiving N310 consecutive "out-of-sync" indications for the SpCell from lower layers while neither timers T300, T301, T304, T311 nor T319 are running. Here, "N310" is a maximum number of consecutive "out-of-sync" (OOS) indications for the SpCell received from lower layers, and may also refer to the value of a counter N310. For recovery of physical layer problems, upon receiving N311 consecutive "in-sync" indications for the SpCell from lower layers while timer T310 is running, the UE 402 stops the timer T310 for the corresponding SpCell. Here, "N311" is a maximum number of consecutive "in-of-sync" indications for the SpCell received from lower layers, and may also refer to the value of a counter N311. In this case, the UE 402 maintains the RRC connection without explicit signalling, and the UE 402 maintains the entire radio resource configuration. Periods in time where neither "in-sync" nor "out-of-sync" is reported by L1 do not affect the evaluation of the number of consecutive "in-sync" or "out-of-sync" indications.

For detection of RLFs, upon timer T310 expiry in a PCell; upon receipt of a random access problem indication from an MCG MAC layer instance while neither timers T300, T301, T304, T311 nor T319 are running; or upon receipt of an indication from an MCG RLC layer instance that the maximum number of retransmissions has been reached, and for the corresponding logical channel allowedServingCells only includes SCell(s), the UE 402 initiates the failure information procedure as specified in section 5.7.5 of [TS38331] to report an RLC failure if the indication is from the MCG RLC layer instance and CA duplication is configured and activated. Otherwise, the UE 402 considers an RLF to be detected for the MCG; performs the actions upon going to RRC_IDLE as specified in section 5.3.11 of [TS38331] with release cause 'other' if access stratum (AS) security has not been activated; performs the actions upon going to RRC_IDLE as specified in section 5.3.11 of [TS38331] with release cause 'RRC connection failure' if AS security has been activated but SRB2 and at least one DRB have not been setup; or initiates the connection re-establishment procedure as specified in section 5.3.7 of [TS38331].

Upon timer T310 expiration in a PSCell; upon receipt of a random access problem indication from an SCG MAC layer instance; or upon receipt of an indication from an SCG RLC layer instance that the maximum number of retransmissions has been reached, and for the corresponding logical channel allowedServingCells only includes SCell(s), the UE 402 initiates the failure information procedure as specified in section 5.7.5 of 38.331 to report an RLC failure if the indication is from the SCG RLC layer instance and CA duplication is configured and activated; considers an RLF to be detected for the SCG; and initiates the SCG failure information procedure as specified in section 5.7.3 of [TS38331] to report SCG RLF.

For performing Link Recovery Procedures (LRPs), The UE 402 assess the DL RLQ of a serving cell based on the reference signal in the set $\overline{q}_0$ as specified in [TS38213] in order to perform BFD for one or more beams. The RS resource configurations in the set $\overline{q}_0$ can be periodic CSI-RS resources and/or SSBs. The UE 402 can be provided, for each BWP of a serving cell, a set $\bar{q}_0$ of periodic CSI-RS resource configuration indexes by failureDetectionResources and a set $\bar{q}_1$ of periodic CSI-RS resource configuration indexes and/or SSB indexes by candidateBeamRSList for RLQ measurements on the BWP of the serving cell. If the UE 402 is not provided with failureDetectionResources, the UE 402 determines the set $\bar{q}_0$ to include periodic CSI-RS resource configuration indexes with the same values as the RS indexes in the RS sets indicated by a TCI-State for respective CORESETs that the UE 402 uses for monitoring the PDCCH and, if there are two RS indexes in a TCI state, the set $\bar{q}_0$ includes RS indexes with QCL-TypeD configuration for the corresponding TCI states. The UE 402 expects the set $\bar{q}_0$ to include up to two RS indexes. The UE 402 expects single port RS in the set $\bar{q}_0$.

The UE 402 is not required to perform BFD outside the active DL BWP, and the UE 402 is not required to perform Candidate Beam Detection (CBD) outside the active DL BWP. CBD for SSB based beams is discussed in clause 8.5.5 of 3GPP TS 38.133 v15.6.0 (2019 Jul. 3) (hereinafter "[TS38113]"), and CBD for CSI-RS based beams is discussed in clause 8.5.6 of [TS38113]. The UE 402 is not required to meet the requirements in clauses 8.5.2 and 8.5.3 of [TS38113] if the UE 402 does not have set W.

The thresholds $Q_{out,LR}$ and $Q_{in,LR}$ correspond to the default value of rlmInSyncOutOfSyncThreshold, as described in [TS38113] for $Q_{out}$, and to the value provided by rsrp-ThresholdSSB, respectively.

On each RS resource configuration in the set $\bar{q}_0$, the UE 402 estimates the RLQ and compares it to the threshold $Q_{out\_LR}$ for the purpose of accessing DL RLQ of the serving cell beams. The threshold $Q_{out\_LR}$ is defined as the level at which the DL radio level link of a given resource configuration on set $\bar{q}_0$ cannot be reliably received and shall correspond to the $BLER_{out}$=10% block error rate of a hypothetical PDCCH transmission. For SSB based BFD, $Q_{out\_LR\_SSB}$ is derived based on the hypothetical PDCCH transmission parameters listed in Table 8.5.2.1-1 in [TS38113]. For CSI-RS based BFD, $Q_{out\_LR\_CSI-RS}$ is derived based on the hypothetical PDCCH transmission parameters listed in Table 8.5.3.1-1 in [TS38113].

The physical layer (PHY) in the UE 402 assesses the RLQ according to the set $\bar{q}_0$ of resource configurations against the threshold $Q_{out,LR}$. For the set $\bar{q}_0$, the UE 402 assesses the RLQ only according to periodic CSI-RS resource configurations or SSBs that are QCLed with the DM-RS of PDCCH receptions monitored by the UE 402, as described in [TS38214]. The UE 402 applies the $Q_{in,LR}$ threshold to the L1-RSRP measurement obtained from a SS/PBCH block. The UE 402 applies the $Q_{in,LR}$ threshold to the L1-RSRP measurement obtained for a CSI-RS resource after scaling a respective CSI-RS reception power with a value provided by powerControlOffsetSS.

In non-Discontinuous Reception (DRX) mode operation, the PHY in the UE 402 provides an indication to higher layers when the RLQ for all corresponding resource configurations in the set $\bar{q}_0$ that the UE 402 uses to assess the RLQ is worse than the threshold $Q_{out,LR}$. The physical layer informs the higher layers when the RLQ is worse than the threshold $Q_{out,LR}$ with a periodicity determined by the maximum between the shortest periodicity among the periodic CSI-RS configurations and/or SSBs in the set $\bar{q}_0$ that the UE 402 uses to assess the RLQ and 2 milliseconds (ms). In DRX mode operation, the physical layer provides an indication to higher layers when the RLQ is worse than the threshold $Q_{out,LR}$ with a periodicity determined as described in [TS38113].

Upon request from higher layers, the UE 402 provides, to higher layers, the periodic CSI-RS configuration indexes and/or SSB indexes from the set $\bar{q}_1$ and the corresponding L1-RSRP measurements that are larger than or equal to the $Q_{in,LR}$ threshold. The UE 402 delivers configuration indexes from the set $\bar{q}_1$ as specified in [TS38213] to higher layers, and the corresponding L1-RSRP measurement provided that the measured L1-RSRP is equal to or better than the threshold $Q_{in,LR}$, which is indicated by higher layer parameter rsrp-ThresholdSSB. The UE 402 applies the $Q_{in,LR}$ threshold to the L1-RSRP measurement obtained from an SSB. The UE 402 applies the $Q_{in,LR}$ threshold to the L1-RSRP measurement obtained for a CSI-RS resource after scaling a respective CSI-RS reception power with a value provided by the higher layer parameter powerControlOffsetSS. The RS resource configurations in the set $\bar{q}_1$ can be periodic CSI-RS resources, SSBs, or both SSB and CSI-RS resources.

A UE 402 can be provided a CORESET through a link to a search space set provided by recoverySearchSpaceId, as described in subclause 10.1 of [TS38213] for monitoring PDCCH in the CORESET. If the UE 402 is provided recoverySearchSpaceId, the UE 402 does not expect to be provided another search space set for monitoring PDCCH in the CORESET associated with the search space set provided by recoverySearchSpaceId.

The UE 402 may receive by PRACH-ResourceDedicatedBFR, a configuration for PRACH transmission as described in subclause 8.1 of [TS38213]. For PRACH transmission in slot n and according to antenna port QCL parameters associated with periodic CSI-RS resource configuration or with SS/PBCH block associated with index $q_{new}$ provided by higher layers (see e.g., [TS38321]), the UE 402 monitors PDCCH in a search space set provided by recoverySearchSpaceId for detection of a DCI format with CRC scrambled by Cell Radio Network Temporary Identifier (C-RNTI) or Modulation and Coding Scheme (MCS)-C-RNTI starting from slot n+4 within a window configured by BeamFailureRecoveryConfig. For PDCCH monitoring in a search space set provided by recoverySearchSpaceId and for corresponding PDSCH reception, the UE 402 assumes the same antenna port quasi-collocation parameters as the ones associated with index $q_{new}$ until the UE 402 receives, by higher layers, an activation for a TCI state or any of the parameters tci-StatesPDCCH-ToAddList and/or tci-StatesPDCCH-ToReleaseList. After the UE 402 detects a DCI format with CRC scrambled by C-RNTI or MCS-C-RNTI in the search space set provided by recoverySearchSpaceId, the UE 402 continues to monitor PDCCH candidates in the search space set provided by recoverySearchSpaceId until the UE 402 receives a MAC CE activation command for a TCI state or tci-StatesPDCCH-ToAddList and/or tci-StatesPDCCH-ToReleaseList.

After 28 symbols from a last symbol of a first PDCCH reception in a search space set provided by recoverySearchSpaceId for which the UE 402 detects a DCI format with CRC scrambled by C-RNTI or MCS-C-RNTI and until the UE 402 receives an activation command for PUCCH-SpatialRelationInfo (see e.g., [TS38321]) or is provided PUCCH-SpatialRelationInfo for PUCCH resource(s), the UE 402 transmits a PUCCH on a same cell as the PRACH transmission using a same spatial filter as for the last PRACH transmission, and a power determined as described in subclause 7.2.1 of [TS38213] with $q_u$=0, $q_d$=$q_{new}$, and l=0. After 28 symbols from a last symbol of a first PDCCH reception in a search space set provided by recoverySearchSpaceId where a UE 402 detects a DCI format with CRC scrambled by C-RNTI or MCS-C-RNTI, the UE 402 assumes same antenna port quasi-collocation parameters as the ones associated with index $q_{new}$ for PDCCH monitoring in a CORESET with index 0.

For RLM on an unlicensed SpCell and RRM, it is considered beneficial to configure DRS Measurement Time Configuration (DMTCs) in which UEs 402 can perform measurements. It is considered beneficial that these time-domain measurement windows for RRM measurements and RLM can be different. RLM DMTC may coincide with DRS transmission window. For RLM in NR-U, the UE 402 may identify a set of RLM-RS (e.g., DRS, SS/PBCH blocks (SSBs), and/or CSI-RS). The transmission of the RS in a COT may be subject to LBT, and the UE 402 may identify which set(s) of RLM-RS are used for IS and OOS evaluations. For example, determining which RLM-RS within or outside the RLM measurement window can be utilized for IS and OOS evaluations. In some embodiments, the UE 402 may support reporting of Received Signal Strength Indicators (RSSI). some embodiments, the UE 402 may report a metric to represent channel occupancy (e.g., COT) or medium contention in addition to RSSI, as also noted from a higher-layer perspective. The exact definition of the metric(s) can be considered when specifications are developed.

For UE measurements in NR-U, it is assumed that recurring transmissions of SSB and Remaining Minimum System Information (RMSI) will be available with possibly reduced opportunities due to LBT. The NR licensed measurement framework (e.g., cell and beam quality derivation for RSRP, RSRQ, and SINR, filtering and combining multiple beams) is used as a baseline. The handling of missing measurements due to LBT may be captured at physical layer specifications.

The plurality of ANs may be coupled with one another via an X2 interface (if the RAN 404 is an LTE RAN or Evolved Universal Terrestrial Radio Access Network (E-UTRAN) 410) or an Xn interface (if the RAN 404 is a NG-RAN 414). The X2/Xn interfaces, which may be separated into control/user plane interfaces in some embodiments, may allow the ANs to communicate information related to handovers, data/context transfers, mobility, load management, interference coordination, etc.

The ANs 408 of the RAN 404 may each manage one or more cells, cell groups, component carriers, etc. to provide the UE 402 with an air interface for network access. The UE 402 may be simultaneously connected with a plurality of cells provided by the same or different ANs 408 of the RAN 404. For example, the UE 402 and RAN 404 may use carrier aggregation (CA) to allow the UE 402 to connect with a plurality of component carriers, each corresponding to a PCell or SCell. A PCell is an MCG cell, operating on a primary frequency, in which the UE 402 performs an initial connection establishment procedure and/or initiates a connection re-establishment procedure. An SCell is a cell providing additional radio resources on top of a Special Cell (SpCell) when the UE 402 is configured with CA. In CA, two or more Component Carriers (CCs) are aggregated. The UE 402 may simultaneously receive or transmit on one or multiple CCs depending on its capabilities. A UE 402 with single timing advance capability for CA can simultaneously receive and/or transmit on multiple CCs corresponding to multiple serving cells sharing the same timing advance (multiple serving cells grouped in one timing advance group (TAG)). A UE 402 with multiple timing advance capability for CA can simultaneously receive and/or transmit on multiple CCs corresponding to multiple serving cells with different timing advances (multiple serving cells grouped in multiple TAGs). The NG-RAN 414 ensures that each TAG contains at least one serving cell; A non-CA capable UE 402 can receive on a single CC and transmit on a single CC corresponding to one serving cell only (one serving cell in one TAG). CA is supported for both contiguous and non-contiguous CCs. When CA is deployed frame timing and SFN are aligned across cells that can be aggregated, or an offset in multiples of slots between the PCell/PSCell and an SCell is configured to the UE 402. In some implementations, the maximum number of configured CCs for a UE 402 is 16 for DL and 16 for UL.

In Dual Connectivity (DC) scenarios, a first AN 408 may be a master node that provides a Master Cell Group (MCG) and a second AN 408 may be secondary node that provides an Secondary Cell Group (SCG). The first and second ANs 408 may be any combination of eNB, gNB, ng-eNB, etc. The MCG is a subset of serving cells comprising the PCell and zero or more SCells. The SCG is a subset of serving cells comprising the PSCell and zero or more SCells. As alluded to previously, DC operation involves the use of PSCells and SpCells. A PSCell is an SCG cell in which the UE 402 performs random access (RA) when performing a reconfiguration with Sync procedure, and an SpCell for DC operation is a PCell of the MCG or the PSCell of the SCG; otherwise the term SpCell refers to the PCell. Additionally, the PCell, PSCells, SpCells, and the SCells can operate in the same frequency range (e.g., FR1 or FR2), or the PCell, PSCells, SpCells, and the SCells can operate in different frequency ranges. In one example, the PCell may operate in a sub-6 GHz frequency range/band and the SCell can operate at frequencies above 24.25 GHz (e.g., FR2).

The RAN 404 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

For LBT systems, such as NR in the unlicensed band ("NR-U"), dynamic Time Division Duplexing (TDD) may be supported. In dynamic TDD, the UL-DL allocation may change over time to adapt to traffic conditions. To enable dynamic TDD, the UE 402 determines when and where to transmit and receive based on an indication of a channel occupancy time (COT) structure. The COT comprises multiple slots and each slot comprises DL resources, UL resources, or flexible resources. The COT structure reduces power consumption and channel access delay.

In some embodiments, the RAN 404 may be an E-UTRAN 410 with one or more eNBs 412. The E-UTRAN 410 provides an LTE air interface (Uu) with the following characteristics: subcarrier spacing (SCS) of 15 kHz; cyclic prefix (CP)-OFDM waveform for DL and SC-FDMA waveform for UL; turbo codes for data and TBCC for control; etc. The LTE air interface may rely on channel state information reference signals (CSI-RS) for channel state information (CSI) acquisition and beam management; Physical Downlink Shared Channel (PDSCH)/Physical Downlink Control Channel (PDCCH) Demodulation Reference Signal (DMRS) for PDSCH/PDCCH demodulation; and cell-specific reference signals (CRS) for cell search and initial acquisition, channel quality measurements, and channel estimation for coherent demodulation/detection at the UE. The LTE air interface may operating on sub-6 GHz bands.

In some embodiments, the RAN 404 may be an next generation (NG)-RAN 414 with one or more gNB 416 and/or on or more ng-eNB 418. The gNB 416 connects with 5G-enabled UEs 402 using a 5G NR interface. The gNB 416 connects with a 5GC 440 through an NG interface, which includes an N2 interface or an N3 interface. The ng-eNB 418 also connects with the 5GC 440 through an NG interface, but may connect with a UE 402 via the Uu interface. The gNB 416 and the ng-eNB 418 may connect with each other over an Xn interface.

In some embodiments, the NG interface may be split into two parts, an NG user plane (NG-U) interface, which carries traffic data between the nodes of the NG-RAN 414 and a UPF (e.g., N3 interface), and an NG control plane (NG-C) interface, which is a signaling interface between the nodes of the NG-RAN 414 and an AMF (e.g., N2 interface).

The NG-RAN 414 may provide a 5G-NR air interface (which may also be referred to as a Uu interface) with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use Physical Broadcast Channel (PBCH) DMRS for PBCH demodulation; Phase Tracking Reference Signals (PTRS) for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an Synchronization Signal Block (SSB) that is an area of a DL resource grid that includes Primary Synchronization Signal (PSS)/Secondary Synchronization Signal (SS S)/PBCH.

The 5G-NR air interface may utilize bandwidth parts (BWPs) for various purposes as mentioned previously. For example, BWP can be used for dynamic adaptation of the SCS. For example, the UE 402 can be configured with multiple BWPs where each BWP configuration has a different SCS. When a BWP change is indicated to the UE 402, the SCS of the transmission is changed as well. Another use case example of BWP is related to power saving. In particular, multiple BWPs can be configured for the UE 402 with different amount of frequency resources (e.g., PRBs) to support data transmission under different traffic loading scenarios. A BWP containing a smaller number of PRBs can be used for data transmission with small traffic load while allowing power saving at the UE 402 and in some cases at the gNB 416. A BWP containing a larger number of PRBs can be used for scenarios with higher traffic load.

The RAN 404 is communicatively coupled to CN 420, which includes network elements and/or network functions (NFs) to provide various functions to support data and telecommunications services to customers/subscribers (e.g., UE 402). The network elements and/or NFs may be implemented by one or more servers 421, 441. The components of the CN 420 may be implemented in one physical node or separate physical nodes. In some embodiments, NFV may be utilized to virtualize any or all of the functions provided by the network elements of the CN 420 onto physical compute/storage resources in servers, switches, etc. A logical instantiation of the CN 420 may be referred to as a network slice, and a logical instantiation of a portion of the CN 420 may be referred to as a network sub-slice.

The CN 420 may be an LTE CN 422 (also referred to as an Evolved Packet Core (EPC) 422). The EPC 422 may include MME, SGW, SGSN, HSS, PGW, PCRF, and/or other NFs coupled with one another over various interfaces (or "reference points") (not shown). The CN 420 may be a 5GC 440 including an AUSF, AMF, SMF, UPF, NSSF, NEF, NRF, PCF, UDM, AF, and/or other NFs coupled with one another over various service-based interfaces and/or reference points (see e.g., FIGS. 5 and 6). The 5GC 440 may enable edge computing by selecting operator/3rd party services to be geographically close to a point that the UE 402 is attached to the network. This may reduce latency and load on the network. In edge computing implementations, the 5GC 440 may select a UPF close to the UE 402 and execute traffic steering from the UPF to DN 436 via the N6 interface. This may be based on the UE subscription data, UE location, and information provided by the AF, which allows the AF to influence UPF (re)selection and traffic routing.

The data network (DN) 436 may represent various network operator services, Internet access, or third party services that may be provided by one or more servers including, for example, application (app)/content server 438. The DN 436 may be an operator external public, a private PDN, or an intra-operator packet data network, for example, for provision of IMS services. In this embodiment, the server 438 can be coupled to an IMS via an S-CSCF or the I-CSCF. In some implementations, the DN 436 may represent one or more local area DNs (LADNs), which are DNs 436 (or DN names (DNNs)) that is/are accessible by a UE 402 in one or more specific areas. Outside of these specific areas, the UE 402 is not able to access the LADN/DN 436.

Additionally or alternatively, the DN 436 may be an Edge DN 436, which is a (local) Data Network that supports the architecture for enabling edge applications. In these embodiments, the app server 438 may represent the physical hardware systems/devices providing app server functionality and/or the application software resident in the cloud or at an edge compute node that performs server function(s). In some embodiments, the app/content server 438 provides an edge hosting environment that provides support required for Edge Application Server's execution.

In some embodiments, the 5GS can use one or more edge compute nodes to provide an interface and offload processing of wireless communication traffic. In these embodiments, the edge compute nodes may be included in, or co-located with one or more RAN 410, 414. For example, the edge compute nodes can provide a connection between the RAN 414 and UPF in the 5GC 440. The edge compute nodes can use one or more NFV instances instantiated on virtualization infrastructure within the edge compute nodes to process wireless connections to and from the RAN 414 and a UPF 502.

In some implementations, the system 400 may include an SMSF, which is responsible for SMS subscription checking and verification, and relaying SM messages to/from the UE 402 to/from other entities, such as an SMS-GMSC/IWMSC/SMS-router. The SMS may also interact with AMF and UDM for a notification procedure that the UE 402 is available for SMS transfer (e.g., set a UE not reachable flag, and notifying UDM when UE 402 is available for SMS).

Figure 5:
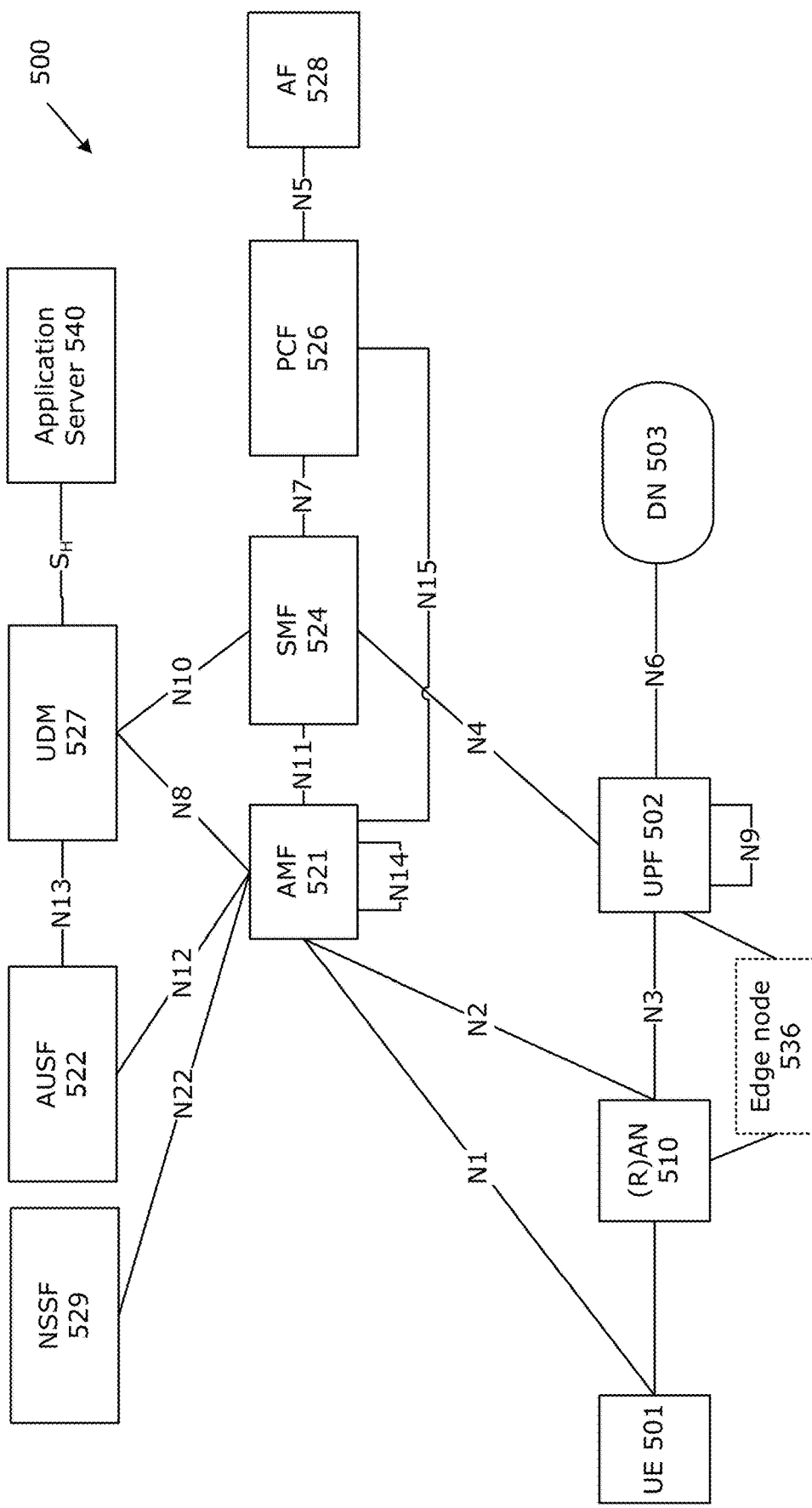
FIGS. 5 and 6 illustrate example core network architectures according to various embodiments.
Figure 6:
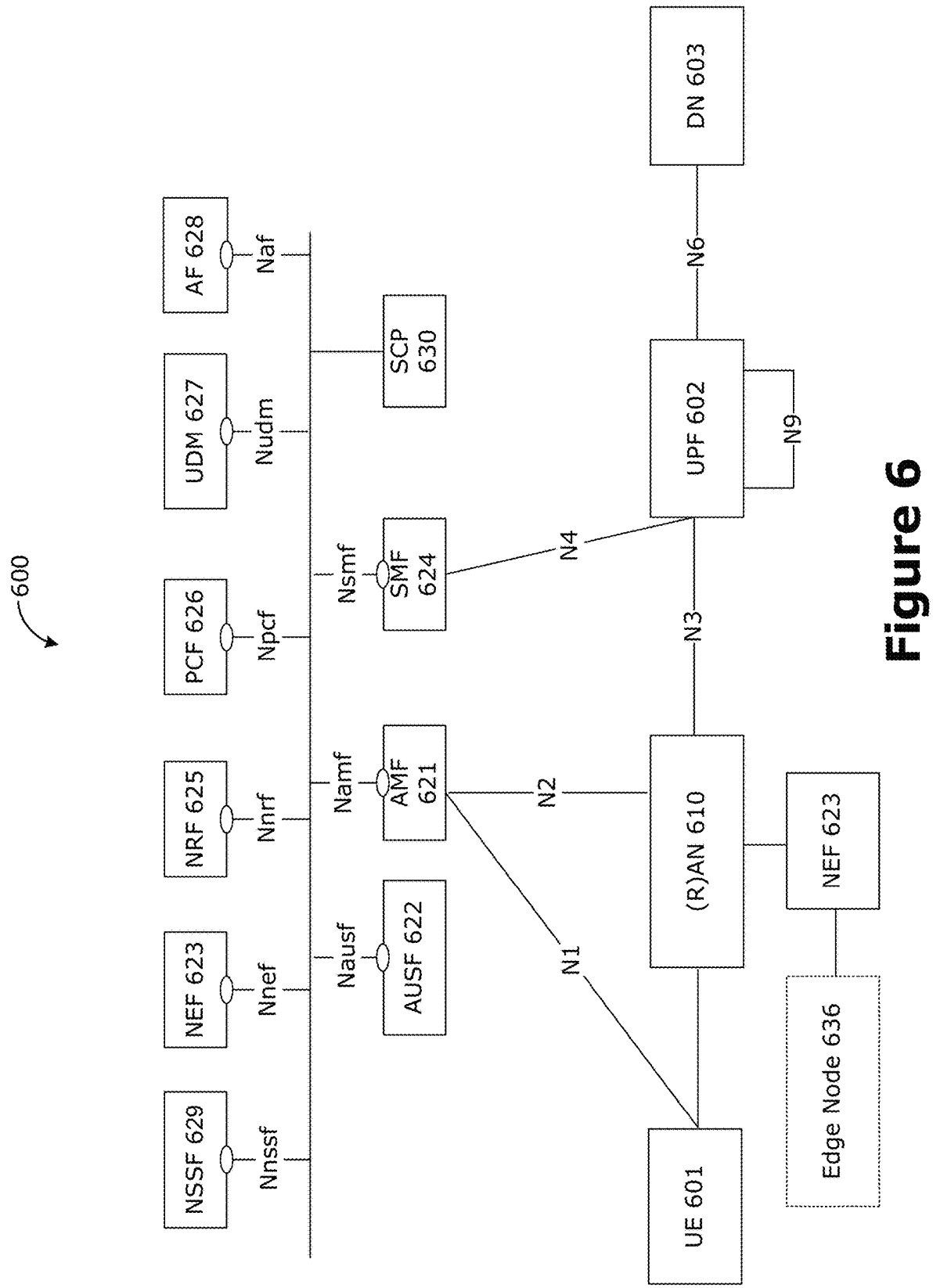

FIGS. 5 and 6 illustrate example system architectures 500 and 600 (collectively "5GC 500") of a 5GC such as CN 440 of FIG. 4, in accordance with various embodiments. In particular, FIG. 5 shows an exemplary 5G system architecture 500 in a reference point representation where interactions between NFs are represented by corresponding point-to-point reference points Ni, and FIG. 6 illustrates an exemplary 5G system architecture 600 in a service-based representation where interactions between NFs are represented by corresponding service-based interfaces. The system 500 is shown to include a UE 501, which may be the same or similar to the UEs 402 discussed previously; a (R)AN 510, which may be the same or similar to the AN 408 discussed previously; and a DN 503, which may be, for example, operator services, Internet access or 3rd party services, and may correspond with a Packet Data Network in LTE systems; and a 5GC 520. The 5GC 520 may include an an Access and Mobility Management Function (AMF) 521; an Authentication Server Function (AUSF) 522; a Session Management Function (SMF) 524; a Network Exposure Function (NEF) 523; a Policy Control Function (PCF) 526; an NF Repository Function (NRF) 525; a Unified Data Management (UDM) 527; an Application Function (AF) 528; a User Plane Function (UPF) 502; a Network Slice Selection Function (NSSF) 529; and a Service Communication Proxy (SCP) 530.

The reference point representation of FIG. 5 shows various interactions between corresponding NFs. For example, FIG. 5 illustrates the following reference points: N1 (between the UE 501 and the AMF 521), N2 (between the RAN 510 and the AMF 521), N3 (between the RAN 510 and the UPF 502), N4 (between the SMF 524 and the UPF 502), N5 (between the PCF 526 and the AF 528), N6 (between the UPF 502 and the DN 503), N7 (between the SMF 524 and the PCF 526), N8 (between the UDM 527 and the AMF 521), N9 (between two UPFs 502), N10 (between the UDM 527 and the SMF 524), N11 (between the AMF 521 and the SMF 524), N12 (between the AUSF 522 and the AMF 521), N13 (between the AUSF 522 and the UDM 527), N14 (between two AMFs 521), N15 (between the PCF 526 and the AMF 521 in case of a non-roaming scenario, or between the PCF 526 and a visited network and AMF 521 in case of a roaming scenario), N16 (between two SMFs; not shown), and N22 (between AMF 521 and NSSF 525). Other reference point representations not shown in FIG. 5 can also be used.

The service-based representation of FIG. 6 represents NFs within the control plane that enable other authorized NFs to access their services. In this regard, 5G system architecture 300 can include the following service-based interfaces: Namf (a service-based interface exhibited by the AMF 521), Nsmf (a service-based interface exhibited by the SMF 524), Nnef (a service-based interface exhibited by the NEF 523), Npcf (a service-based interface exhibited by the PCF 526), Nudm (a service-based interface exhibited by the UDM 527), Naf (a service-based interface exhibited by the AF 528), Nnrf (a service-based interface exhibited by the NRF 525), Nnssf (a service-based interface exhibited by the NSSF 529), Nausf (a service-based interface exhibited by the AUSF 522). Other service-based interfaces (e.g., Nudr, N5 g-eir, and Nudsf) not shown in FIG. 6 can also be used. In embodiments, the NEF 523 can provide an interface to Edge node 536, which can be used to process wireless connections with the RAN 510.

The AUSF 522 stores data for authentication of UE 501 and handle authentication-related functionality. The AUSF 522 may facilitate a common authentication framework for various access types. The AUSF 522 may communicate with the AMF 521 via an N12 reference point between the AMF 521 and the AUSF 522; and may communicate with the UDM 527 via an N13 reference point between the UDM 527 and the AUSF 522. Additionally, the AUSF 522 may exhibit an Nausf service-based interface.

The AMF 521 allows other functions of the 5GC 500 to communicate with the UE 501 and the RAN 510 and to subscribe to notifications about mobility events with respect to the UE 501. The AMF 521 is also responsible for registration management (e.g., for registering UE 501), connection management, reachability management, mobility management, lawful interception of AMF-related events, and access authentication and authorization. The AMF 521 provides transport for SM messages between the UE 501 and the SMF 524, and acts as a transparent proxy for routing SM messages. AMF 521 also provides transport for SMS messages between UE 501 and an SMSF. AMF 444 interacts with the AUSF 522 and the UE 501 to perform various security anchor and context management functions. Furthermore, AMF 521 is a termination point of a RAN-CP interface, which includes the N2 reference point between the RAN 510 and the AMF 521. The AMF 521 is also a termination point of Non-Access Stratum (NAS) (N1) signaling, and performs NAS ciphering and integrity protection.

The AMF 521 also supports NAS signaling with the UE 501 over an N3IWF interface. The N3IWF provides access to untrusted entities. N3IWF may be a termination point for the N2 interface between the (R)AN 510 and the AMF 521 for the control plane, and may be a termination point for the N3 reference point between the (R)AN 510 and the UPF 502 for the user plane. As such, the AMF 521 handles N2 signalling from the SMF 524 and the AMF 521 for PDU sessions and QoS, encapsulate/de-encapsulate packets for IPSec and N3 tunneling, marks N3 user-plane packets in the uplink, and enforces QoS corresponding to N3 packet marking taking into account QoS requirements associated with such marking received over N2. N3IWF may also relay UL and DL control-plane NAS signalling between the UE 501 and AMF 521 via an N1 reference point between the UE 501 and the AMF 521, and relay uplink and downlink user-plane packets between the UE 501 and UPF 502. The N3IWF also provides mechanisms for IPsec tunnel establishment with the UE 501. The AMF 521 may exhibit an Namf service-based interface, and may be a termination point for an N14 reference point between two AMFs 540 and an N17 reference point between the AMF 521 and a 5G-EIR (not shown by FIG. 4).

The SMF 524 is responsible for SM (e.g., session establishment, tunnel management between UPF 502 and (R)AN 510); UE IP address allocation and management (including optional authorization); selection and control of UP function; configuring traffic steering at UPF 502 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 521 over N2 to (R)AN 510; and determining SSC mode of a session. SM refers to management of a PDU session, and a PDU session or "session" refers to a PDU connectivity service that provides or enables the exchange of PDUs between the UE 501 and the DN 503.

The UPF 502 acts as an anchor point for intra-RAT and inter-RAT mobility, an external PDU session point of interconnect to data network 503, and a branching point to support multi-homed PDU session. The UPF 502 also performs packet routing and forwarding, packet inspection, enforces user plane part of policy rules, lawfully intercept packets (UP collection), performs traffic usage reporting, perform QoS handling for a user plane (e.g., packet filtering, gating, UL/DL rate enforcement), performs uplink traffic verification (e.g., SDF-to-QoS flow mapping), transport level packet marking in the uplink and downlink, and performs downlink packet buffering and downlink data notification triggering. UPF 502 may include an uplink classifier to support routing traffic flows to a data network.

The NSSF 529 selects a set of network slice instances serving the UE 501. The NSSF 529 also determines allowed NSSAI and the mapping to the subscribed S-NSSAIs, if needed. The NSSF 529 also determines an AMF set to be used to serve the UE 501, or a list of candidate AMFs 521 based on a suitable configuration and possibly by querying the NRF 525. The selection of a set of network slice instances for the UE 501 may be triggered by the AMF 521 with which the UE 501 is registered by interacting with the NSSF 529; this may lead to a change of AMF 521. The NSSF 529 interacts with the AMF 521 via an N22 reference point; and may communicate with another NSSF in a visited network via an N31 reference point (not shown).

The NEF 523 securely exposes services and capabilities provided by 3GPP NFs for third party, internal exposure/re-exposure, AFs 528, edge computing or fog computing systems (e.g., edge compute node 536, etc. In such embodiments, the NEF 523 may authenticate, authorize, or throttle the AFs. NEF 523 may also translate information exchanged with the AF 528 and information exchanged with internal network functions. For example, the NEF 523 may translate between an AF-Service-Identifier and an internal 5GC information. NEF 523 may also receive information from other NFs based on exposed capabilities of other NFs. This information may be stored at the NEF 523 as structured data, or at a data storage NF using standardized interfaces. The stored information can then be re-exposed by the NEF 523 to other NFs and AFs 528, or used for other purposes such as analytics.

The NRF 525 supports service discovery functions, receives NF discovery requests from NF instances, and provides information of the discovered NF instances to the requesting NF instances. NRF 525 also maintains information of available NF instances and their supported services. The NRF 525 also supports service discovery functions, wherein the NRF 525 receives NF Discovery Request from NF instance or an SCP (not shown), and provides information of the discovered NF instances to the NF instance or SCP.

The PCF 526 provides policy rules to control plane functions to enforce them, and may also support unified policy framework to govern network behavior. The PCF 526 may also implement a front end to access subscription information relevant for policy decisions in a UDR of the UDM 527. In addition to communicating with functions over reference points as shown, the PCF 526 exhibit an Npcf service-based interface.

The UDM 527 handles subscription-related information to support the network entities' handling of communication sessions, and stores subscription data of UE 501. For example, subscription data may be communicated via an N8 reference point between the UDM 527 and the AMF 521. The UDM 527 may include two parts, an application front end and a UDR. The UDR may store subscription data and policy data for the UDM 527 and the PCF 526, and/or structured data for exposure and application data (including PFDs for application detection, application request information for multiple UEs 501) for the NEF 523. The Nudr service-based interface may be exhibited by the UDR 221 to allow the UDM 527, PCF 526, and NEF 523 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 527 may exhibit the Nudm service-based interface.

The AF 528 provides application influence on traffic routing, provide access to NEF 523, and interact with the policy framework for policy control. The AF 528 may influence UPF 502 (re)selection and traffic routing. Based on operator deployment, when AF 528 is considered to be a trusted entity, the network operator may permit AF 528 to interact directly with relevant NFs.

Additionally, the AF 528 may be used for edge computing implementations. The 5GC 500 may enable edge computing by selecting operator/3rd party services to be geographically close to a point that the UE 501 is attached to the network. This may reduce latency and load on the network. In edge computing implementations, the 5GC 500 may select a UPF 502 close to the UE 402 and execute traffic steering from the UPF 502 to DN 503 via the N6 interface. This may be based on the UE subscription data, UE location, and information provided by the AF 528, which allows the AF 528 to influence UPF (re)selection and traffic routing.

The DN 503 may represent various network operator services, Internet access, or third party services that may be provided by one or more servers including, for example, application (app)/content server 540. The DN 503 may be an operator external public, a private PDN, or an intra-operator packet data network, for example, for provision of IMS services. In this embodiment, the app server 540 can be coupled to an IMS via an S-CSCF or the I-CSCF. In some implementations, the DN 503 may represent one or more local area DNs (LADNs), which are DNs 503 (or DN names (DNNs)) that is/are accessible by a UE 501 in one or more specific areas. Outside of these specific areas, the UE 501 is not able to access the LADN/DN 503.

In some implementations, the DN 503 may be, or include, one or more edge compute nodes 536. Additionally or alternatively, the DN 503 may be an Edge DN 503, which is a (local) Data Network that supports the architecture for enabling edge applications. In these embodiments, the app server 540 may represent the physical hardware systems/devices providing app server functionality and/or the application software resident in the cloud or at an edge compute node 536 that performs server function(s). In some embodiments, the app/content server 540 provides an edge hosting environment that provides support required for Edge Application Server's execution.

In some embodiments, the 5GS can use one or more edge compute nodes 536 to provide an interface and offload processing of wireless communication traffic. In these embodiments, the edge compute nodes 536 may be included in, or co-located with one or more RANs 510. For example, the edge compute nodes 536 can provide a connection between the RAN 510 and UPF 502 in the 5GC 500. The edge compute nodes 536 can use one or more NFV instances instantiated on virtualization infrastructure within the edge compute nodes 536 to process wireless connections to and from the RAN 510 and UPF 502.

In embodiments, the edge node 536 may include or be part of an edge system (or edge network). The edge node 536 may also be referred to as "edge hosts 536" or "edge servers 536." The edge system includes a collection of edge servers 536 and edge management systems (not shown) necessary to run edge computing applications within an operator network or a subset of an operator network. The edge servers 536 are physical computer systems that may include an edge platform and/or virtualization infrastructure, and provide compute, storage, and network resources to edge computing applications. Each of the edge servers 536 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 401, 501 The VI of the edge servers 536 provide virtualized environments and virtualized resources for the edge hosts, and the edge computing applications may run as VMs and/or application containers on top of the VI. Various edge computing/networking technologies in various combinations and layouts of devices located at the edge of a network may be used. Examples of such edge computing/networking technologies that may implement the embodiments herein include ETSI MEC; CDNs Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

The SCP 530 (or individual instances of the SCP 530) supports indirect communication (see e.g., 3GPP TS 23.501 section 7.1.1); delegated discovery (see e.g., 3GPP TS 23.501 section 7.1.1); message forwarding and routing to destination NF/NF service(s), communication security (e.g., authorization of the NF Service Consumer to access the NF Service Producer API) (see e.g., 3GPP TS 33.501), load balancing, monitoring, overload control, etc.; and discovery and selection functionality for UDM(s), AUSF(s), UDR(s), PCF(s) with access to subscription data stored in the UDR based on UE's SUPI, SUCI or GPSI (see e.g., 3GPP TS 23.501 section 6.3). Load balancing, monitoring, overload control functionality provided by the SCP may be implementation specific. The SCP 230 may be deployed in a distributed manner. More than one SCP 530 can be present in the communication path between various NF Services. The SCP 530, although not an NF instance, can also be deployed distributed, redundant, and scalable.

The system architecture 500/300 may also include other elements that are not shown by FIG. 5 or 3, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 2). Individual NFs may share a UDSF for storing their respective unstructured data or individual NFs may each have their own UDSF located at or near the individual NFs. Additionally, the UDSF may exhibit an Nudsf service-based interface (not shown by FIG. 2). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

In another example, the 5G system architecture 500 includes an IP multimedia subsystem (IMS) as well as a plurality of IP multimedia core network subsystem entities, such as call session control functions (CSCFs) (not shown by FIG. 5 or 3). More specifically, the IMS includes a CSCF, which can act as a proxy CSCF (P-CSCF), a serving CSCF (S-CSCF), an emergency CSCF (E-CSCF), or interrogating CSCF (I-CSCF). The P-CSCF can be configured to be the first contact point for the UE 501 within the IMS. The S-CSCF can be configured to handle the session states in the network, and the E-CSCF can be configured to handle certain aspects of emergency sessions such as routing an emergency request to the correct emergency center or public safety answering point (PSAP). The I-CSCF can be configured to function as the contact point within an operator's network for all IMS connections destined to a subscriber of that network operator, or a roaming subscriber currently located within that network operator's service area. In some aspects, the I-CSCF can be connected to another IP multimedia network, for example, an IMS operated by a different network operator.

Additionally, there may be many more reference points and/or service-based interfaces between the NF services in the NFs; however, these interfaces and reference points have been omitted from FIGS. 5 and 6 for clarity. In one example, the CN 520 may include an Nx interface, which is an inter-CN interface between the MME and the AMF 521 in order to enable interworking between system 200 and an EPC. Other example interfaces/reference points may include an N5 g-EIR service-based interface exhibited by a 5G-EIR, an N27 reference point between the NRF in the visited network and the NRF in the home network; and an N31 reference point between the NSSF in the visited network and the NSSF in the home network.

Figure 7:
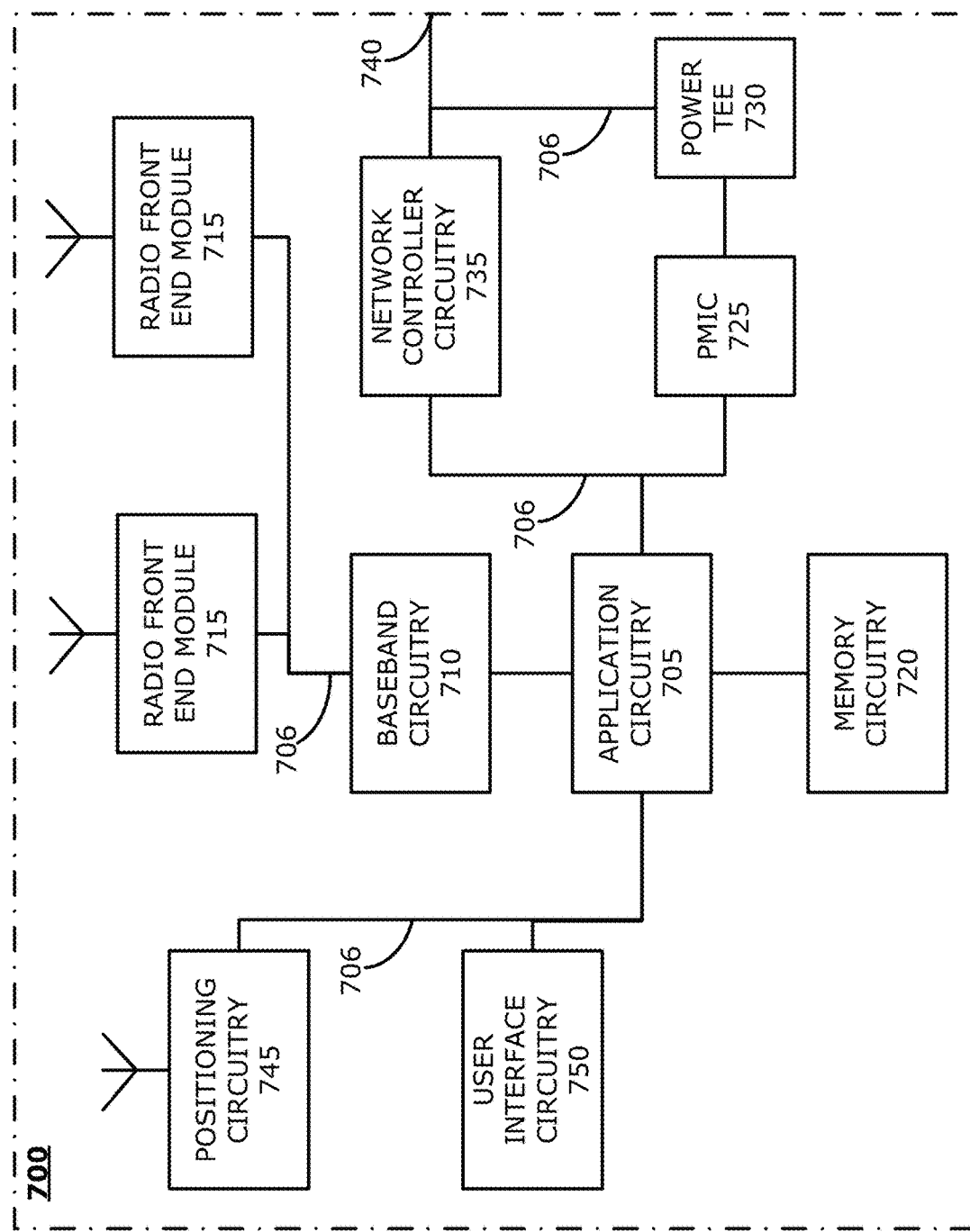
FIG. 7 illustrates an example of infrastructure equipment in accordance with various embodiments.

FIG. 7 illustrates an example of infrastructure equipment 700 in accordance with various embodiments. The infrastructure equipment 700 (or "system 700") may be implemented as a base station, radio head, RAN node such as the AN 408 shown and described previously, application server(s) 438, and/or any other element/device discussed herein. In other examples, the system 700 could be implemented in or by a UE 401.

The system 700 includes application circuitry 705, baseband circuitry 710, one or more radio front end modules (RFEMs) 715, memory circuitry 720, power management integrated circuitry (PMIC) 725, power tee circuitry 730, network controller circuitry 735, network interface connector 740, satellite positioning circuitry 745, and user interface 750. In some embodiments, the device 700 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 705 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry x05 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 705 may comprise, or may be, a special-purpose processor/controller to operate according to the various embodiments herein. As examples, the processor(s) of application circuitry 705 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 700 may not utilize application circuitry 705, and instead may include a special-purpose processor/controller to process IP data received from an EPC or 5GC, for example.

In some implementations, the application circuitry 705 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits.

User interface circuitry 750 may include one or more user interfaces designed to enable user interaction with the system 700 or peripheral component interfaces designed to enable peripheral component interaction with the system 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 715 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 715, which incorporates both mmWave antennas and sub-mmWave.

The memory circuitry 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 720 may be implemented as one or more of solder down packaged integrated circuits, socketed memory modules and plug-in memory cards.

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 730 provides for electrical power to be drawn from a network cable to provide both power supply and data connectivity to the infrastructure equipment 700 using a single cable.

The network controller circuitry 735 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 740 using a physical connection, which may be electrical (commonly referred to as a "copper interconnect"), optical, or wireless. The network controller circuitry 735 may include one or more dedicated processors and/or FPGAs to communicate using one or more of the aforementioned protocols. In some implementations, the network controller circuitry 735 may include multiple controllers to provide connectivity to other networks using the same or different protocols.

The positioning circuitry 745 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like.

The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-Technology for Positioning, Navigation, and Timing (Micro-PNT) IC that uses a master timing clock to perform position tracking/estimation without GNSS assistance. The positioning circuitry 745 may also be part of, or interact with, the baseband circuitry 710 and/or RFEMs 715 to communicate with the nodes and components of the positioning network. The positioning circuitry 745 may also provide position data and/or time data to the application circuitry 705, which may use the data to synchronize operations with various infrastructure (e.g., AN 408, etc.), or the like.

The components shown by FIG. 7 may communicate with one another using interface circuitry, which may include any number of bus and/or interconnect (IX) technologies such as ISA, extended ISA, I2C, SPI, point-to-point interfaces, power management bus (PMBus), PCI, PCIe, PCIx, Intel® UPI, Intel® IAL, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, and/or any number of other IX technologies. The IX technology may be a proprietary bus, for example, used in an SoC based system.

Figure 8:
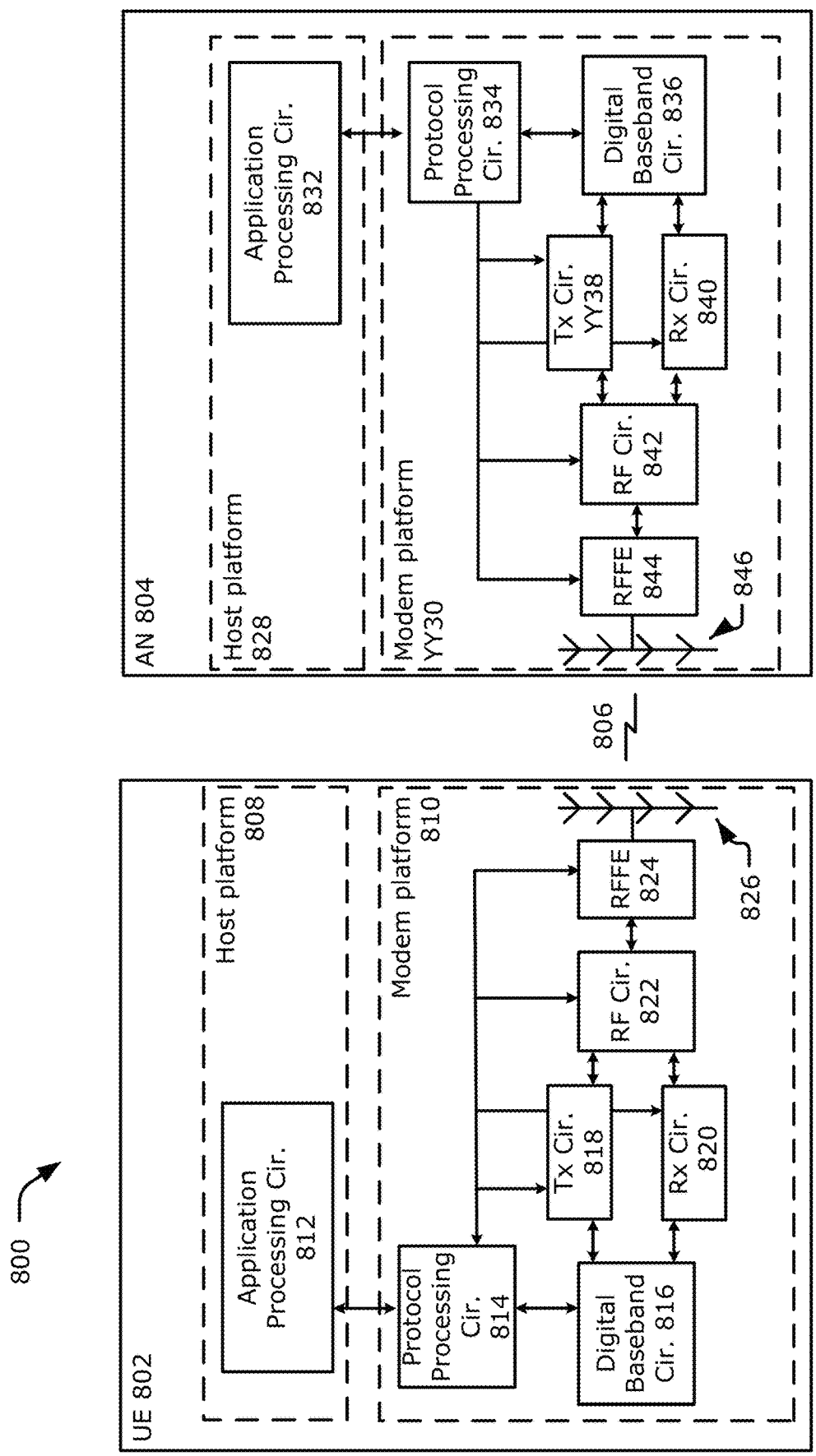
FIG. 8 schematically illustrates a wireless network in accordance with various embodiments.

FIG. 8 schematically illustrates a wireless network 800 in accordance with various embodiments. The wireless network 800 includes a UE 802 in wireless communication with an AN 804. The UE 802 and AN 84 may be the same, similar to, and/or substantially interchangeable with, like-named components described elsewhere herein such as the UE 501 and RAN 404 of FIG. 4, and/or system 700 of FIG. 4.

The UE 802 may be communicatively coupled with the AN 804 via connection 806. The connection 806 is illustrated as an air interface to enable communicative coupling, and can be consistent with cellular communications protocols such as an LTE protocol or a 5G NR protocol operating at mmWave or sub-6 GHz frequencies.

The UE 802 may include a host platform 808 coupled with a modem platform 810. The host platform 808 may include application processing circuitry 812, which may be coupled with protocol processing circuitry 814 of the modem platform 810. The application processing circuitry 812 may run various applications for the UE 802 that source/sink application data. The application processing circuitry 812 may further implement one or more layer operations to transmit/receive application data to/from a data network. These layer operations may include transport (for example UDP) and Internet (for example, IP) operations The protocol processing circuitry 814 may implement one or more of layer operations to facilitate transmission or reception of data over the connection 806. The layer operations implemented by the protocol processing circuitry 814 may include, for example, MAC, RLC, PDCP, RRC and NAS operations.

The modem platform 810 may further include digital baseband circuitry 816 that may implement one or more layer operations that are "below" layer operations performed by the protocol processing circuitry 814 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 810 may further include transmit circuitry 818, receive circuitry 820, RF circuitry 822, and RF front end (RFFE) 824, which may include or connect to one or more antenna panels 826. Briefly, the transmit circuitry 818 may include a digital-to-analog converter, mixer, intermediate frequency (IF) components, etc.; the receive circuitry 820 may include an analog-to-digital converter, mixer, IF components, etc.; the RF circuitry 822 may include a low-noise amplifier, a power amplifier, power tracking components, etc.; RFFE 824 may include filters (for example, surface/bulk acoustic wave filters), switches, antenna tuners, beamforming components (for example, phase-array antenna components), etc. The selection and arrangement of the components of the transmit circuitry 818, receive circuitry 820, RF circuitry 822, RFFE 824, and antenna panels 826 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 814 may include one or more instances of control circuitry (not shown) to provide control functions for the transmit/receive components.

A UE reception may be established by and via the antenna panels 826, RFFE 824, RF circuitry 822, receive circuitry 820, digital baseband circuitry 816, and protocol processing circuitry 814. In some embodiments, the antenna panels 826 may receive a transmission from the AN 804 by receive-beamforming signals received by a plurality of antennas/antenna elements of the one or more antenna panels 826.

A UE transmission may be established by and via the protocol processing circuitry 814, digital baseband circuitry 816, transmit circuitry 818, RF circuitry 822, RFFE 824, and antenna panels 826. In some embodiments, the transmit components of the UE 804 may apply a spatial filter to the data to be transmitted to form a transmit beam emitted by the antenna elements of the antenna panels 826.

Similar to the UE 802, the AN 804 may include a host platform 828 coupled with a modem platform 830. The host platform 828 may include application processing circuitry 832 coupled with protocol processing circuitry 834 of the modem platform 830. The modem platform may further include digital baseband circuitry 836, transmit circuitry 838, receive circuitry 840, RF circuitry 842, RFFE circuitry 844, and antenna panels 846. The components of the AN 804 may be similar to and substantially interchangeable with like-named components of the UE 802. In addition to performing data transmission/reception as described above, the components of the AN 808 may perform various logical functions that include, for example, RNC functions such as radio bearer management, uplink and downlink dynamic radio resource management, and data packet scheduling.

Although not shown, the components of UE 802 and/or AN 804 may communicate with one another using a suitable bus or interconnect (IX) technology, which may include any number of technologies, including ISA, extended ISA, I2C, SPI, point-to-point interfaces, power management bus (PM- Bus), PCI, PCIe, PCIx, Intel® UPI, Intel® IAL, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX technology may be a proprietary bus, for example, used in an SoC based system.

Figure 9:
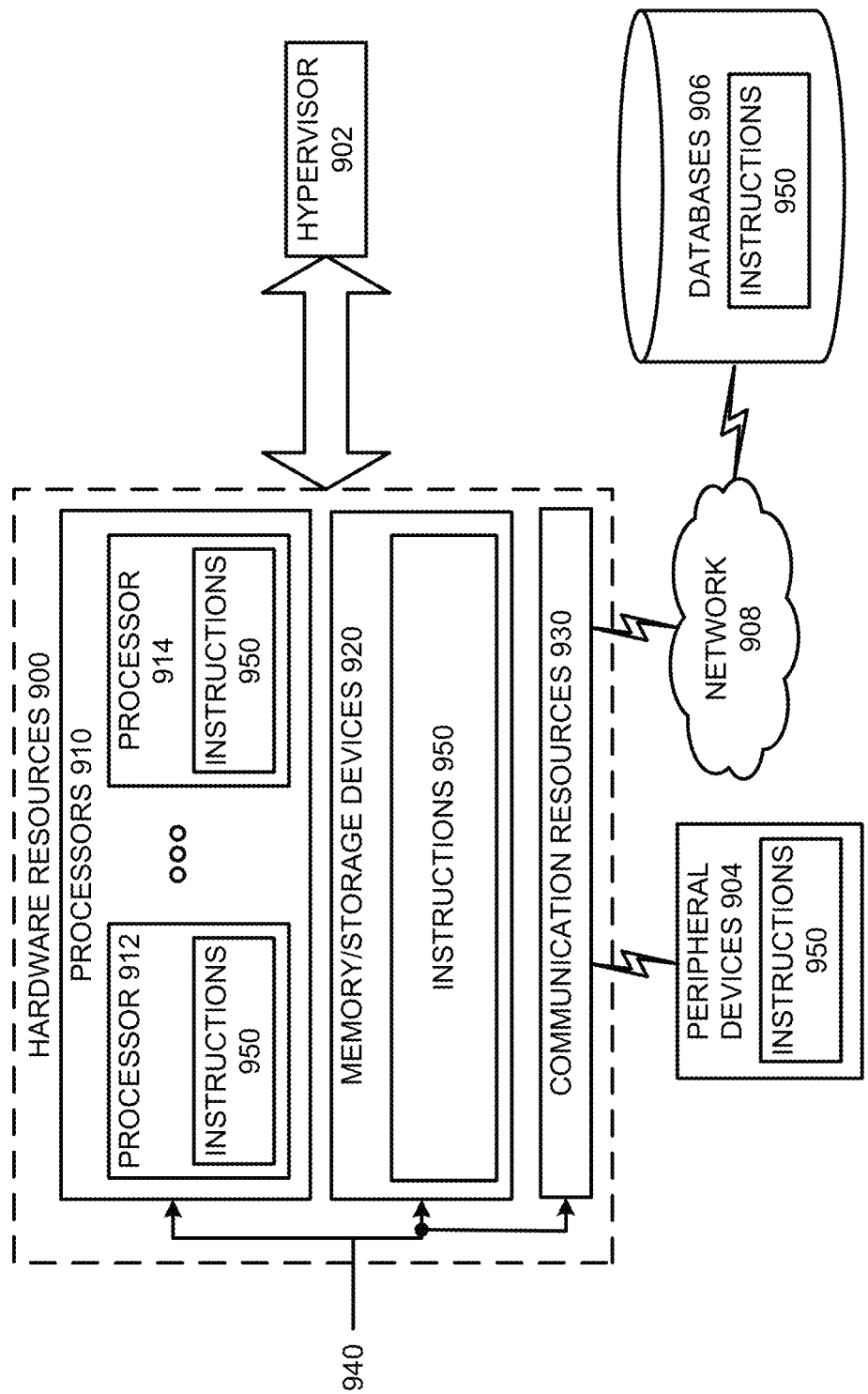
FIG. 9 is a block diagram illustrating components, according to some example embodiments, able to read instructions from a machine-readable or computer-readable medium (e.g., a non-transitory machine-readable storage medium) and perform any one or more of the methodologies discussed herein.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. For embodiments where node virtualization (e.g., NFV) is utilized, a hypervisor 902 may be executed to provide an execution environment for one or more network slices/sub-slices to utilize the hardware resources 900.

The processors 910 may include, for example, a processor 912 and a processor 914. The processor(s) 910 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 920 may include main memory, disk storage, or any suitable combination thereof. The memory/storage devices 920 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via USB), cellular communication components, NFC components, Bluetooth® (or Bluetooth® Low Energy) components, Wi-Fi® components, and other communication components.

Instructions 650 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 650 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

3. Example Implementations

Figure 10:
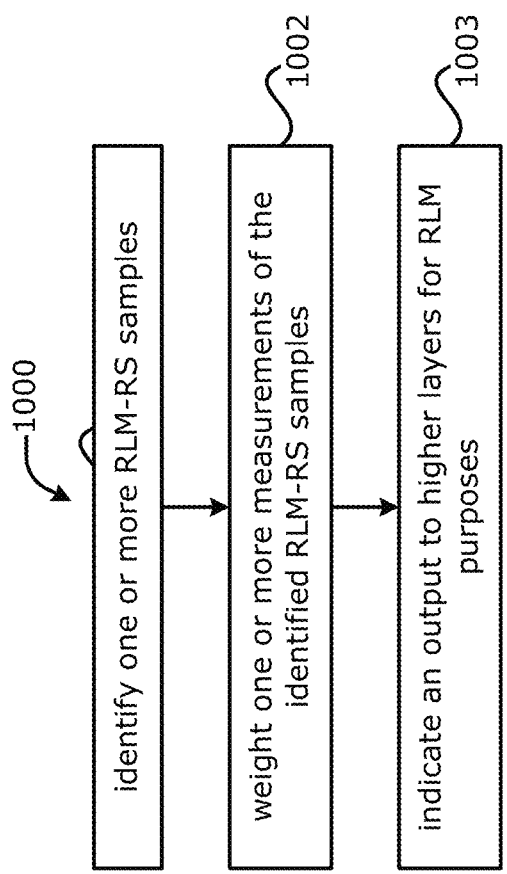
FIG. 10 illustrates an example procedure for practicing various embodiments discussed herein.

FIG. 10 illustrates process 1000 for practicing various embodiments herein. While particular examples and orders of operations are illustrated FIG. 10, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Process 1000 may be performed by an MDAS producer. Process 1000 begins at operation 1001 wherein the UE 402 identifies one or more RLM-RS samples. At operation 1002, the the UE 402 weights one or more measurements of the identified RLM-RS samples. At operation 1003, the UE 402 indicates an output of the weighting to higher layers for RLM purposes. After operation 1003, Process 1000 may end or repeat as necessary.

Additional examples of the presently described embodiments include the following, non-limiting implementations. Each of the following non-limiting examples may stand on its own or may be combined in any permutation or combination with any one or more of the other examples provided below or throughout the present disclosure.

Example A01 includes a method comprising: identifying RS samples; weighting a measurement from the identified RS samples; and indicating an output to higher layers for the purposes of radio link monitoring.

Example A02 includes the method of example A01 and/or some other example(s) herein, wherein identifying RS samples comprises detecting SSB.

Example A03 includes the method of example A01 and/or some other example(s) herein, wherein identifying RS samples comprises detecting a Channel Occupancy Time (COT) structure Example A04 includes the method of examples A01-A03 and/or some other example(s) herein, wherein the method further comprises: identifying a weighting factor in a received configuration.

Example A05 includes the method of examples A01-A04 and/or some other example(s) herein, wherein the method further comprises: receiving, from a gNB, a weighting factor; and weighting the measurement based on the weighting factor.

Example A06 includes the method of examples A01-A05 and/or some other example(s) herein, wherein the RS samples are samples of a radio link monitoring reference signal (RLM-RS).

Example A07 includes the method of example A06 and/or some other example(s) herein, wherein the RLM-RS includes one or more synchronization signal blocks (SSBs), one or more channel state information reference signals (CSI-RSs), or a combination of SSBs and CSI-RSs.

Example A08 includes the method of examples A01-A04 and/or some other example(s) herein, wherein the output comprises an in-sync (IS) indicator, an out-of-sync (OOS) indicator, or a failed-to-detect (FTD) indicator.

Example A09 includes the method of examples A01-A08 and/or some other example(s) herein, further comprising: determining the output based on a listen-before talk (LBT) failure ratio.

Example A10 includes the method of examples A08-A09 and/or some other example(s) herein, further comprising: generating the output to include the IS indicator and an FTD indicator when link quality is above a threshold and an LBT operation is successful.

Example A11 includes the method of examples A08-A10 and/or some other example(s) herein, further comprising: generating the output to include the OOS indicator and an FTD indicator when the LBT operation is not successful.

Example A12 includes the method of examples A08-A12 and/or some other example(s) herein, further comprising: declaring a radio link failure (RLF) when a predetermined number of FTD indicators are output.

Example A13 includes the method of examples A01-A12 and/or some other example(s) herein, wherein the one or more RLM RS measurement samples include estimated block error rate (BLER) measurements, signal-to-noise ratio (SNR) measurements, and/or or Signal-to-Interference plus Noise Ratio (SINR) measurements.

Example A14 includes a method of operating an access node, the method comprising: generating a message to include one or more weighting factors; and transmitting the message to a user equipment to facilitate a radio link monitoring operation.

Example Z01 may include an apparatus comprising means to perform one or more elements of a method described in or related to any of examples A01-A14, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A01-A14, or any other method or process described herein.

Example Z03 may include an apparatus comprising logic, modules, or circuitry to perform one or more elements of a method described in or related to any of examples A01-A14, or any other method or process described herein.

Example Z04 may include a method, technique, or process as described in or related to any of examples A01-A14, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A01-A14, or portions thereof.

Example Z06 may include a signal as described in or related to any of examples A01-A14, or portions or parts thereof.

Example Z07 may include a datagram, packet, frame, segment, protocol data unit (PDU), or message as described in or related to any of examples A01-A14, or portions or parts thereof, or otherwise described in the present disclosure.

Example Z08 may include a signal encoded with data as described in or related to any of examples A01-A14, or portions or parts thereof, or otherwise described in the present disclosure.

Example Z09 may include a signal encoded with a datagram, packet, frame, segment, protocol data unit (PDU), or message as described in or related to any of examples A01-A14, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A01-A14, or portions thereof.

Example Z11 may include a computer program comprising instructions, wherein execution of the program by a processing element is to cause the processing element to carry out the method, techniques, or process as described in or related to any of examples A01-A14, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

4. Terminology

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable gate array (FPGA), programmable logic device (PLD), complex PLD (CPLD), high-capacity PLD (HCPLD), System-on-Chip (SoC), System-in-Package (SiP), Multi-Chip Package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including random access memory (RAM), magnetoresistive RAM (MRAM), phase change random access memory (PRAM), dynamic random access memory (DRAM) and/or synchronous dynamic random access memory (SDRAM), core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, etc.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "SMTC" refers to an SSB-based measurement timing configuration configured by SSB-MeasurementTimingConfiguration. The term "SSB" refers to an SS/PBCH block. The term "a Primary Cell" refers to the MCG cell, operating on the primary frequency, in which the UE either performs the initial connection establishment procedure or initiates the connection re-establishment procedure. The term "Primary SCG Cell" refers to the SCG cell in which the UE performs random access when performing the Reconfiguration with Sync procedure for DC operation. The term "Secondary Cell" refers to a cell providing additional radio resources on top of a Special Cell for a UE configured with CA. The term "Secondary Cell Group" refers to the subset of serving cells comprising the PSCell and zero or more secondary cells for a UE configured with DC. The term "Serving Cell" refers to the primary cell for a UE in RRC_CONNECTED not configured with CA/DC there is only one serving cell comprising of the primary cell. The term "serving cell" or "serving cells" refers to the set of cells comprising the Special Cell(s) and all secondary cells for a UE in RRC_CONNECTED configured with carrier aggregation (CA). The term "Special Cell" refers to the PCell of the MCG or the PSCell of the SCG for DC operation; otherwise, the term "Special Cell" refers to the Pcell.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-GSB, ITS-GSC, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "access network" refers to any network, using any combination of radio technologies, RATs, and/or communication protocols, used to connect user devices and service providers. In the context of WLANs, an "access network" is an IEEE 802 local area network (LAN) or metropolitan area network (MAN) between terminals and access routers connecting to provider services. The term "access router" refers to router that terminates a medium access control (MAC) service from terminals and forwards user traffic to information servers according to Internet Protocol (IP) addresses.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

A "network slice" refers to a logical network that provides specific network capabilities and network characteristics, supporting various service properties for network slice customers. A "Network Slice instance" or "NSI" represents service view of a network slice which exposes the root NetworkSliceSubnet instance. A "network slice subnet" is a representation of a set of network functions and the associated resources (e.g., compute, storage and networking resources) supporting network. A Network Slice Subnet instance" or "NSSI" refers to a Managed Object Instance (MOI) of Network Slice Subnet Information Object Class (IOC). A "Service Level Specification" or "SLS" refers to a set of service level requirements associated with a Service Level Agreement (SLA) to be satisfied by a network slice.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. An apparatus to be employed as a user equipment (UE), the apparatus comprising:
radiofrequency (RF) circuitry configurable to receive one or more radio link monitoring (RLM) reference signals (RS); and
processor circuitry communicatively coupled with the RF circuitry, the processor circuitry configurable to:
monitor a downlink radio link quality based on one or more RLM-RS measurement samples;
determine an output based on the monitored downlink radio link quality, wherein the output comprises a failed-to-detect (FTD) indicator and one of an in-sync (IS) indicator or an out-of-sync (OOS) indicator;
weight the determined output by a weighting factor; and
indicate the weighted output to higher layers for RLM.

2. The apparatus of claim 1, wherein the one or more RLM-RS include one or more synchronization signal blocks (SSBs), one or more channel state information reference signals (CSI-RSs), or a combination of SSBs and CSI-RSs, and wherein the one or more RLM-RS measurement samples are based on a listen-before-talk (LBT) failure ratio.

3. The apparatus of claim 1, wherein, to monitor the downlink radio link quality based on the one or more RLM-RS measurement samples, the processor circuitry is further configurable to:
detect one or more SSBs.

4. The apparatus of claim 1, wherein, to monitor the downlink radio link quality based on the one or more RLM-RS measurement samples, the processor circuitry is further configurable to:
detect a Channel Occupancy Time (COT) structure.

5. The apparatus of claim 1, wherein the processor circuitry is further configurable to:
identify the weighting factor in a received configuration.

6. The apparatus of claim 1, wherein the processor circuitry is configurable to:
generate the output to include a failed-to-detect (FTD) indicator when an LBT operation is not successful and one of:
the IS indicator when a link quality is better than a first threshold, and
the OOS indicator when a link quality is worse than a second threshold; and
declare a radio link failure (RLF) when a predetermined number of FTD indicators are output.

7. The apparatus of claim 1, wherein, to monitor the downlink radio link quality based on the one or more RLM-RS measurement samples, the processor circuitry is further configurable to: estimate one or more block error rate (BLER) measurements, one or more signal-to-noise ratio ratio (SNR) measurements, or one or more signal-to-interference-plus-noise ratio (SINR) measurements.

8. An apparatus to be employed as a user equipment (UE), the apparatus comprising:
radiofrequency (RF) circuitry configurable to receive one or more radio link monitoring (RLM) reference signal (RS); and
processor circuitry communicatively coupled with the RF circuitry, the processor circuitry configurable to:
identify one or more RLM-RS measurement samples;
weight at least one measurement of the identified one or more measurement samples by a weighting factor;
determine an output based on a listen-before-talk (LBT) failure ratio, wherein the output comprises one or more of an in-sync (IS) indicator, an out-of-sync (OOS) indicator, or a failed-to-detect (FTD) indicator;
generate the output to include the IS indicator and the FTD indicator when a link quality is above a threshold and an LBT operation is successful;
generate the output to include the OOS indicator and the FTD indicator when the LBT operation is not successful; and
indicate the output based on the weighting to higher layers for RLM.

9. The apparatus of claim 8, wherein the processor circuitry is further configurable to:
declare a radio link failure (RLF) when a predetermined number of FTD indicators are output.

10. The apparatus of claim 8, wherein the processor circuitry is configurable to monitor a downlink radio link quality based on one or more RLM-RS measurement samples and, to monitor the downlink radio link quality based on the one or more RLM-RS measurement samples, the processor circuitry is further configurable to: estimate one or more block error rate (BLER) measurements, one or more signal-to-noise ratio (SNR) measurements, or one or more signal-to-interference-plus-noise ratio (SINR) measurements.

11. One or more non-transitory computer readable media (NTCRM) comprising instructions, wherein execution of the instructions by one or more processors of a user equipment (UE) is to cause the UE to:
monitor a downlink radio link quality based on one or more radio link monitoring (RLM) reference signal (RS) measurement samples;
determine an output based on the monitored downlink radio link quality, wherein the output comprises a failed-to-detect (FTD) indicator and one of an in-sync (IS) indicator or an out-of-sync (OOS) indicator;
weight the determined output by a weighting factor; and
indicate the weighted output to higher layers for RLM.

12. The one or more NTCRM of claim 11, wherein the one or more RLM-RS measurement samples include one or more synchronization signal blocks (SSBs), one or more channel state information reference signals (CSI-RSs), or a combination of SSBs and CSI-RSs.

13. The one or more NTCRM of claim 11, wherein, to monitor the downlink radio link quality based on the one or more RLM-RS measurement samples, execution of the instructions is to cause the UE to: detect one or more SSBs.

14. The one or more NTCRM of claim 11, wherein, to monitor the downlink radio link quality based on the one or more RLM-RS measurement samples, execution of the instructions is to cause the UE to: detect a Channel Occupancy Time (COT) structure.

15. The one or more NTCRM of claim 11, wherein execution of the instructions is to cause the UE to: identify the weighting factor in a received configuration.

16. The one or more NTCRM of claim 11, wherein execution of the instructions is to cause the UE to:
    determine the output based on a listen-before-talk (LBT) failure ratio, and the one or more RLM-RS measurement samples are based on the LBT failure ratio.

17. The one or more NTCRM of claim 16, wherein execution of the instructions is to cause the UE to:
    generate the output to include the IS indicator and the FTD indicator when link quality is above a threshold and an LBT operation is successful; and
    generate the output to include the 00S indicator and the FTD indicator or another FTD indicator when the LBT operation is not successful.

18. The one or more NTCRM of claim 16, wherein execution of the instructions is to cause the UE to:
    declare a radio link failure (RLF) when a predetermined number of FTD indicators are output.

19. The one or more NTCRM of claim 11, wherein the one or more RLM-RS measurement samples include estimated block error rate (BLER) measurements or signal-to-noise ratio (SNR) measurements.

\* \* \* \* \*

UNITED STATES PATENT AND TRADEMARK OFFICE
CERTIFICATE OF CORRECTION

PATENT NO. : 11,979,904 B2
APPLICATION NO. : 17/062384
DATED : May 7, 2024
INVENTOR(S) : Bishwarup Mondal et al.

It is certified that error appears in the above-identified patent and that said Letters Patent is hereby corrected as shown below:

In the Claims

Column 42
Claim 8, Line 11, add an "s" at the end of the word "signal"

Column 42
Claim 11, Line 44, add a "-" in-between the words "computer" and "readable"

Column 43
Claim 17, Line 17, replace "00S" with "OOS"

Signed and Sealed this
Second Day of July, 2024

Katherine Kelly Vidal
*Director of the United States Patent and Trademark Office*